(12) United States Patent
Wang

(10) Patent No.: US 12,578,823 B2
(45) Date of Patent: Mar. 17, 2026

(54) DISPLAY INTERFACE TESTING METHOD AND APPARATUS, STORAGE MEDIUM AND ELECTRONIC DEVICE

(71) Applicant: BOE Technology Group Co., Ltd., Beijing (CN)

(72) Inventor: Jingru Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/993,598

(22) PCT Filed: Aug. 17, 2023

(86) PCT No.: PCT/CN2023/113522
§ 371 (c)(1),
(2) Date: Jan. 13, 2025

(87) PCT Pub. No.: WO2024/041443
PCT Pub. Date: Feb. 29, 2024

(65) Prior Publication Data
US 2026/0016916 A1 Jan. 15, 2026

(30) Foreign Application Priority Data

Aug. 24, 2022 (CN) .......................... 202211021124.9

(51) Int. Cl.
| | |
|---|---|
| G06F 3/041 | (2006.01) |
| G06T 7/00 | (2017.01) |
| G06T 7/11 | (2017.01) |
| G06T 7/136 | (2017.01) |
| G06V 40/20 | (2022.01) |
| G06V 10/75 | (2022.01) |

(52) U.S. Cl.
CPC ........ G06F 3/04186 (2019.05); G06T 7/0002 (2013.01); G06T 7/11 (2017.01);
(Continued)

(58) Field of Classification Search
CPC ..... G06F 3/04186; G06T 7/0002; G06T 7/11; G06T 7/136; G06T 2200/24; G06V 40/28; G06V 10/758; G06V 2201/02
See application file for complete search history.

(56) References Cited

U.S. PATENT DOCUMENTS

| | | | | |
|---|---|---|---|---|
| 8,971,642 B2 * | 3/2015 | Dhanda | ................ | G06F 16/958 |
| | | | | 382/218 |
| 2022/0358862 A1 * | 11/2022 | Wang | .................... | G09G 3/006 |
| 2023/0298156 A1 * | 9/2023 | Myren | .................... | G06N 3/08 |
| | | | | 382/141 |

FOREIGN PATENT DOCUMENTS

| | | |
|---|---|---|
| CN | 104133665 A | 11/2014 |
| CN | 105302413 A | 2/2016 |

(Continued)

OTHER PUBLICATIONS

International Search Report mailed on Oct. 26, 2023, received for PCT Application PCT/CN2023/113522, filed on Aug. 17, 2023, 6 pages including English Translation.

(Continued)

*Primary Examiner* — Premal R Patel
(74) *Attorney, Agent, or Firm* — XSENSUS LLP

(57) ABSTRACT

A display interface testing method includes: obtaining a current screen image of a display terminal and a desired screen image corresponding to the current screen image; calculating a first mean square error between the current screen image and the desired screen image, and determining a first image matching relationship between the current screen image and the desired screen image according to the first mean square error; calculating a first difference image between the current screen image and the desired screen image, and determining a second image matching relationship between the current screen image and the desired screen image according to the first difference image; and testing a
(Continued)

display interface of the display terminal according to the first image matching relationship and the second image matching relationship.

19 Claims, 12 Drawing Sheets

(52) U.S. Cl.
CPC .............. *G06T 7/136* (2017.01); *G06V 40/28* (2022.01); *G06T 2200/24* (2013.01); *G06V 10/758* (2022.01); *G06V 2201/02* (2022.01)

(56) References Cited

FOREIGN PATENT DOCUMENTS

| | | | |
|---|---|---|---|
| CN | 109190617 | A | 1/2019 |
| CN | 111476759 | A | 7/2020 |
| CN | 112749077 | A | 5/2021 |
| CN | 112991282 | A | 6/2021 |
| CN | 113407461 | A | 9/2021 |
| CN | 113900960 | A | 1/2022 |
| CN | 113947721 | A | 1/2022 |
| CN | 114067740 | A | 2/2022 |
| CN | 114279679 | A | 4/2022 |
| CN | 115359008 | A | 11/2022 |
| WO | 2022060299 | A1 | 3/2022 |

OTHER PUBLICATIONS

Written Opinion mailed on Oct. 26, 2023, received for PCT Application PCT/CN2023/113522, filed on Aug. 17, 2023, 11 pages including English Translation.
"Geodesic Distance" [online: a blog from Will_Ch], CSDN Blog, posted on Dec. 14, 2020 [retrieved on Jul. 2, 2025], 4 pages including English Translation. Retrieved from : http://lemonc.me/average-geodesic-distance.html.

* cited by examiner

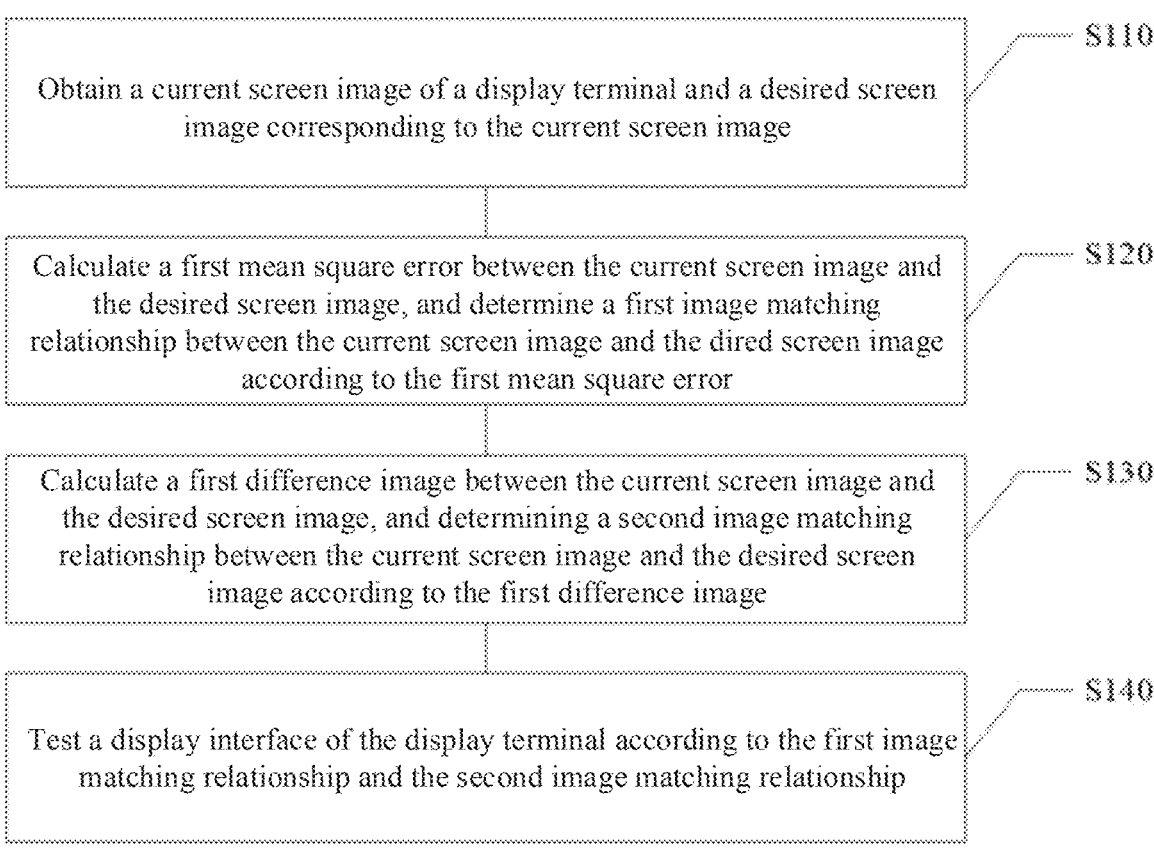

Obtain a current screen image of a display terminal and a desired screen image corresponding to the current screen image ⟋— S110

Calculate a first mean square error between the current screen image and the desired screen image, and determine a first image matching relationship between the current screen image and the dired screen image according to the first mean square error ⟋— S120

Calculate a first difference image between the current screen image and the desired screen image, and determining a second image matching relationship between the current screen image and the desired screen image according to the first difference image ⟋— S130

Test a display interface of the display terminal according to the first image matching relationship and the second image matching relationship ⟋— S140

FIG. 1

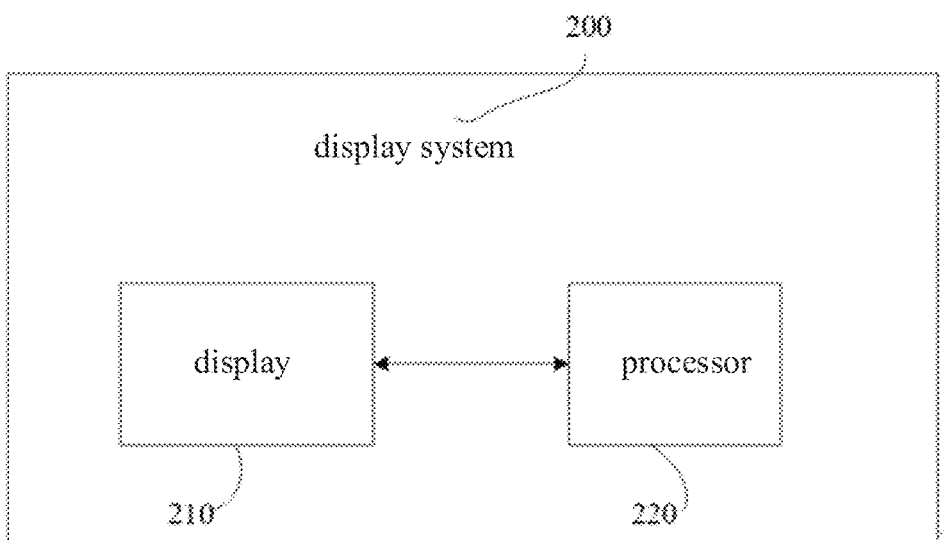

200 display system display    ⟷    processor 210          220

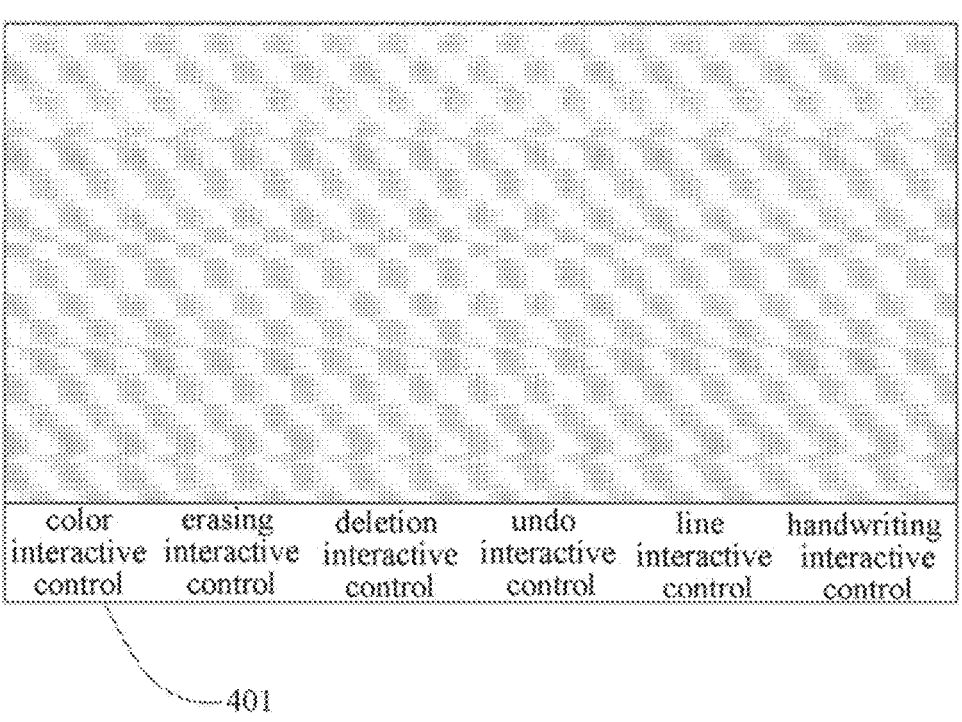

| color interactive control | erasing interactive control | deletion interactive control | undo interactive control | line interactive control | handwriting interactive control |

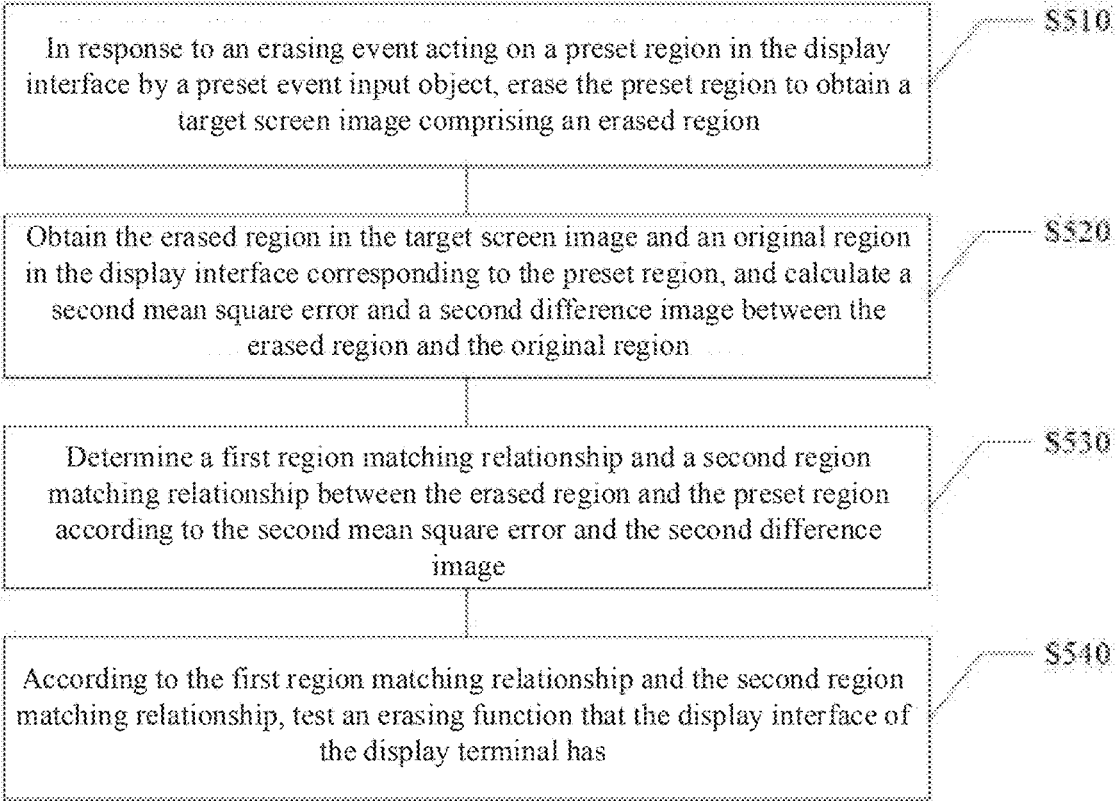

In response to an erasing event acting on a preset region in the display interface by a preset event input object, erase the preset region to obtain a target screen image comprising an erased region — S510

Obtain the erased region in the target screen image and an original region in the display interface corresponding to the preset region, and calculate a second mean square error and a second difference image between the erased region and the original region — S520

Determine a first region matching relationship and a second region matching relationship between the erased region and the preset region according to the second mean square error and the second difference image — S530

According to the first region matching relationship and the second region matching relationship, test an erasing function that the display interface of the display terminal has — S540

FIG. 5

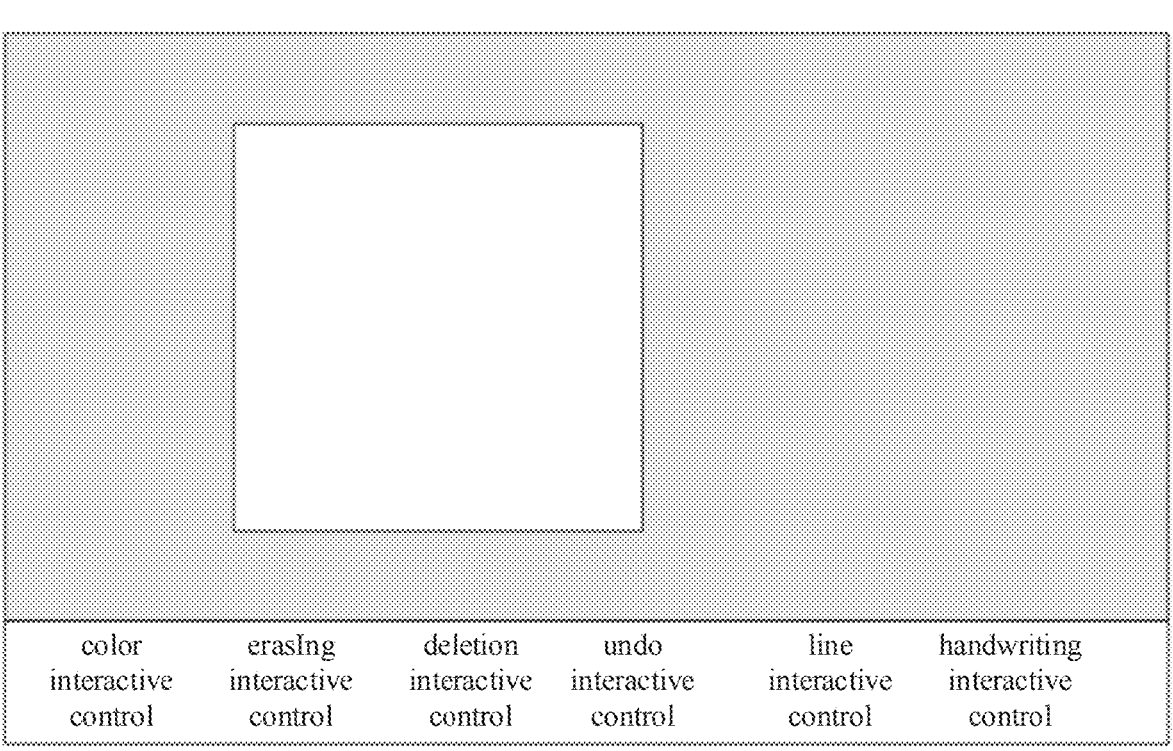

| color interactive control | erasIng interactive control | deletion interactive control | undo interactive control | line interactive control | handwriting interactive control |

FIG. 6

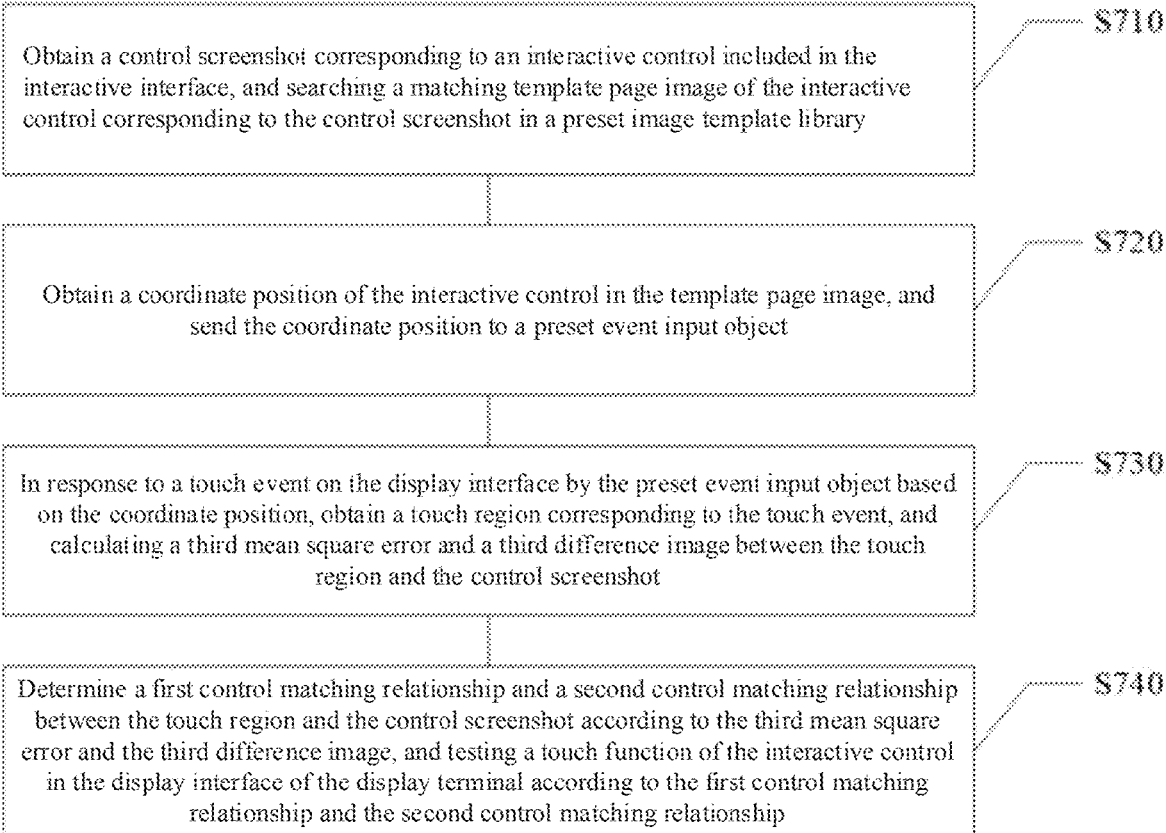

Obtain a control screenshot corresponding to an interactive control included in the interactive interface, and searching a matching template page image of the interactive control corresponding to the control screenshot in a preset image template library — S710

Obtain a coordinate position of the interactive control in the template page image, and send the coordinate position to a preset event input object — S720

In response to a touch event on the display interface by the preset event input object based on the coordinate position, obtain a touch region corresponding to the touch event, and calculating a third mean square error and a third difference image between the touch region and the control screenshot — S730

Determine a first control matching relationship and a second control matching relationship between the touch region and the control screenshot according to the third mean square error and the third difference image, and testing a touch function of the interactive control in the display interface of the display terminal according to the first control matching relationship and the second control matching relationship — S740

FIG. 7

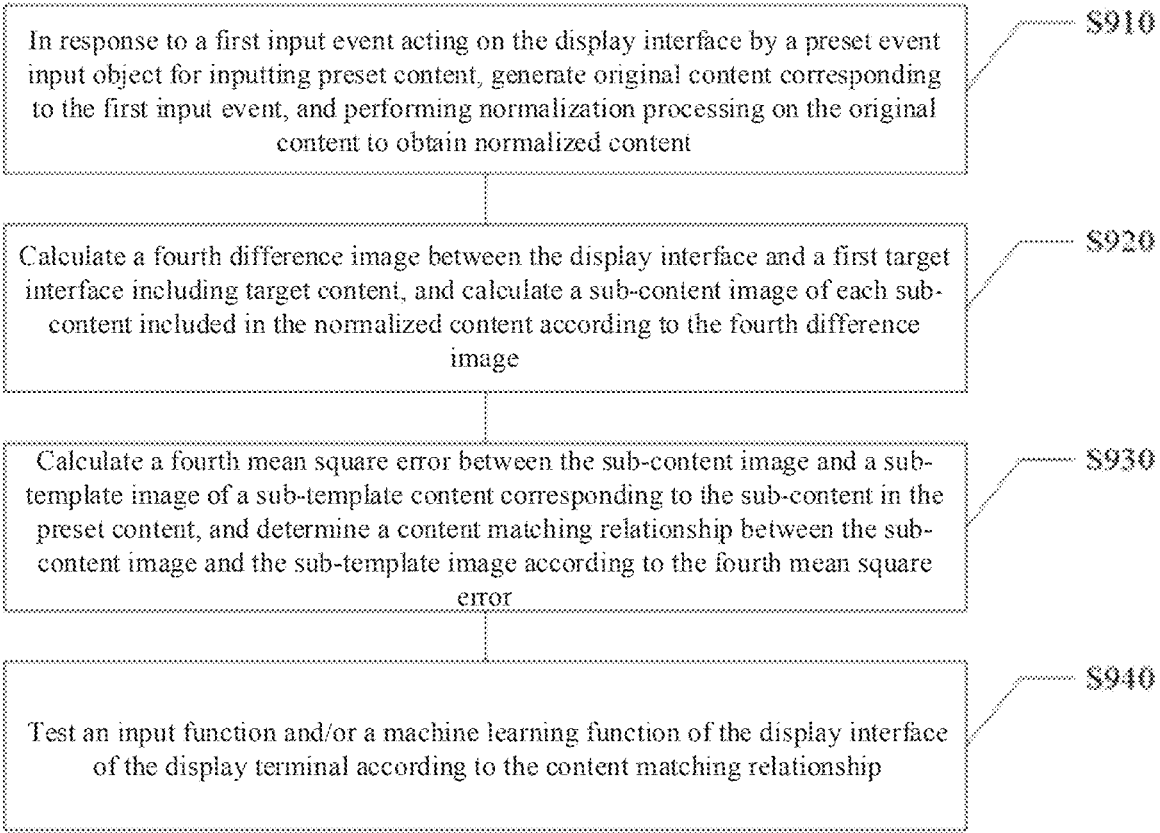

In response to a first input event acting on the display interface by a preset event input object for inputting preset content, generate original content corresponding to the first input event, and performing normalization processing on the original content to obtain normalized content ⟋ S910

Calculate a fourth difference image between the display interface and a first target interface including target content, and calculate a sub-content image of each sub-content included in the normalized content according to the fourth difference image ⟋ S920

Calculate a fourth mean square error between the sub-content image and a sub-template image of a sub-template content corresponding to the sub-content in the preset content, and determine a content matching relationship between the sub-content image and the sub-template image according to the fourth mean square error ⟋ S930

Test an input function and/or a machine learning function of the display interface of the display terminal according to the content matching relationship ⟋ S940

FIG. 9

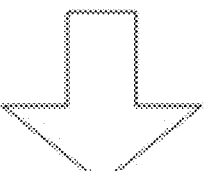
weather forecast
FIG. 10
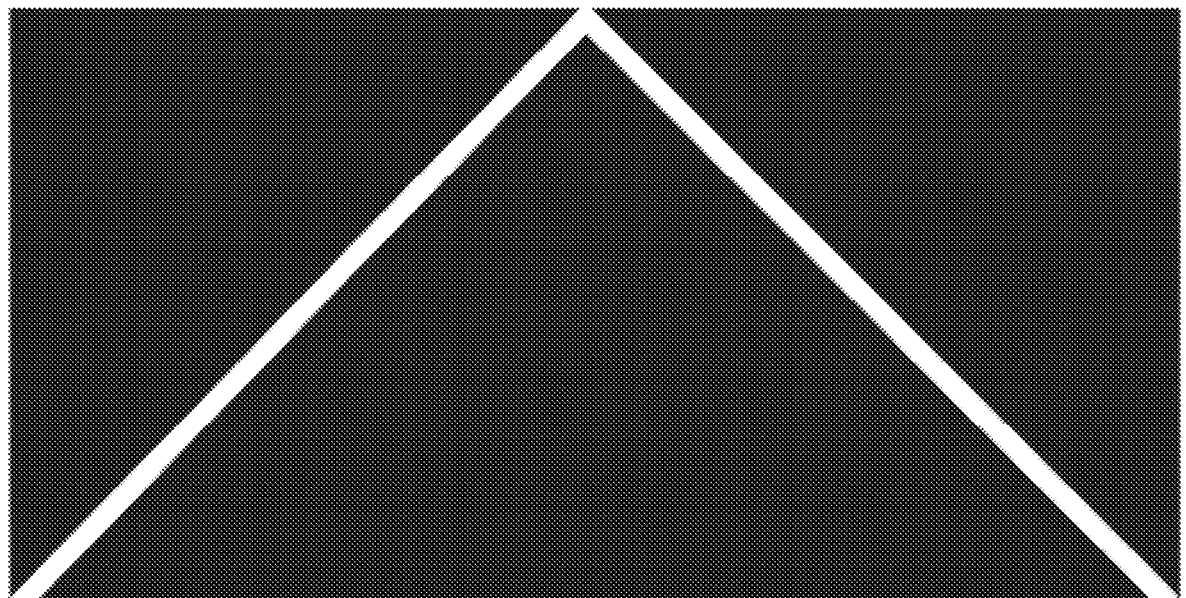
FIG. 11

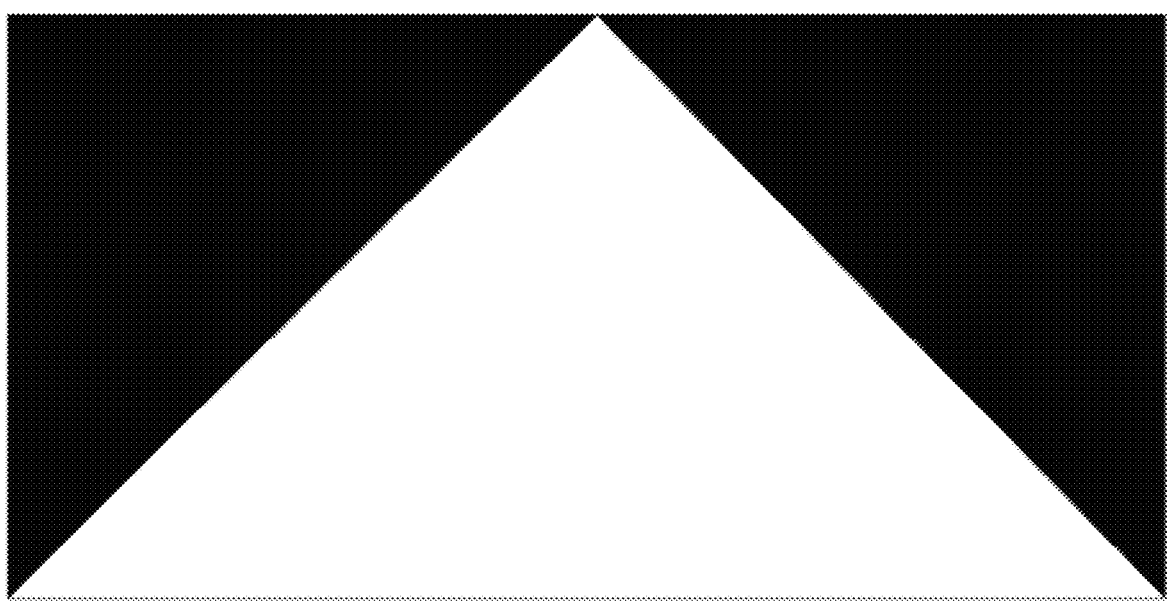

FIG. 12

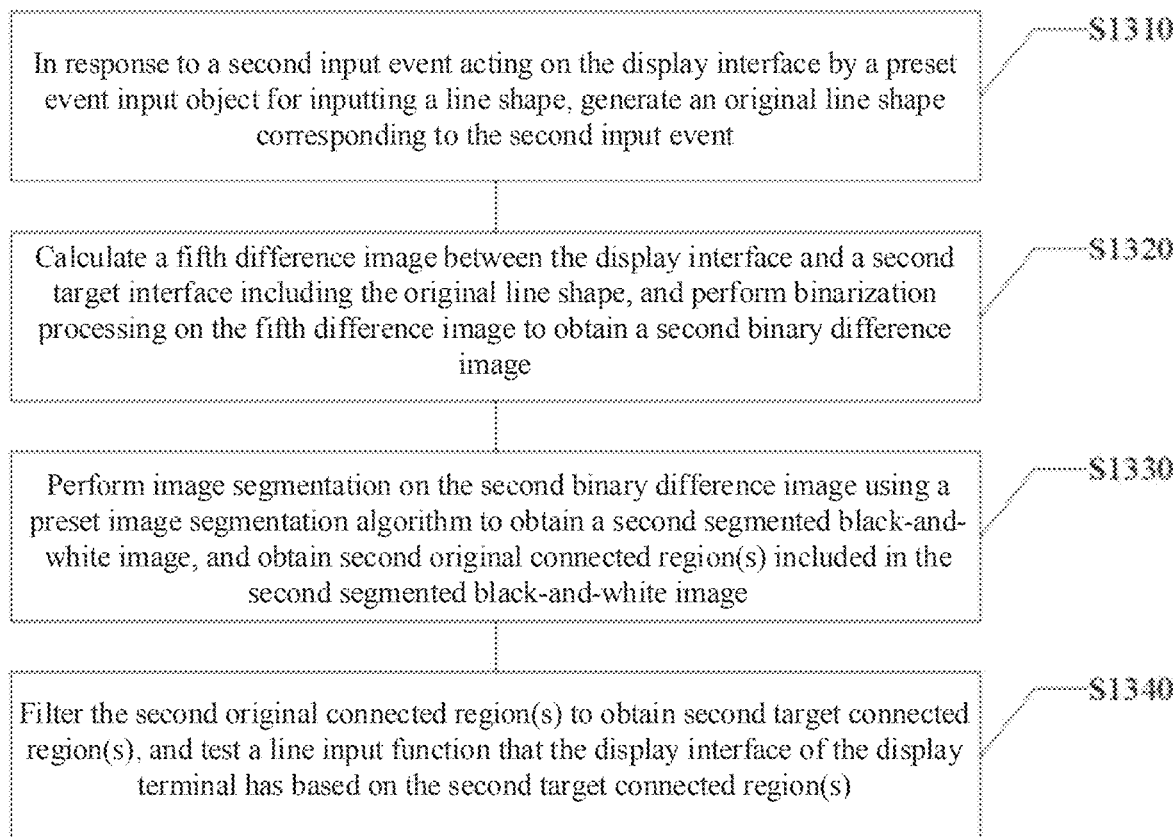

In response to a second input event acting on the display interface by a preset event input object for inputting a line shape, generate an original line shape corresponding to the second input event ⟋ S1310

Calculate a fifth difference image between the display interface and a second target interface including the original line shape, and perform binarization processing on the fifth difference image to obtain a second binary difference image ⟋ S1320

Perform image segmentation on the second binary difference image using a preset image segmentation algorithm to obtain a second segmented black-and-white image, and obtain second original connected region(s) included in the second segmented black-and-white image ⟋ S1330

Filter the second original connected region(s) to obtain second target connected region(s), and test a line input function that the display interface of the display terminal has based on the second target connected region(s) ⟋ S1340

FIG. 13

DISPLAY INTERFACE TESTING METHOD AND APPARATUS, STORAGE MEDIUM AND ELECTRONIC DEVICE

CROSS-REFERENCE TO RELATED APPLICATIONS

The present disclosure is U.S. National Stage of International Application No. PCT/CN2023/113522 filed on Aug. 17, 2023, which claims priority to Chinese patent application No. 202211021124.9, filed on Aug. 24, 2022 and titled "DISPLAY INTERFACE TESTING METHOD AND APPARATUS, STORAGE MEDIUM AND ELECTRONIC DEVICE", the entire content of each is incorporated herein by reference in their entirety.

TECHNICAL FIELD

Embodiments of the present disclosure relate to the automated testing technical field, and in particular, to a display interface testing method, a display interface testing apparatus, a computer-readable storage medium, and an electronic device.

BACKGROUND

In existing testing methods, a display interface of a display terminal needs to be tested manually. However, manual testing results in low testing efficiency and low accuracy of testing results.

SUMMARY

According to an aspect of the present disclosure, there is provided a display interface testing method, including:

obtaining a current screen image of a display terminal and a desired screen image corresponding to the current screen image;

calculating a first mean square error between the current screen image and the desired screen image, and determining a first image matching relationship between the current screen image and the desired screen image according to the first mean square error;

calculating a first difference image between the current screen image and the desired screen image, and determining a second image matching relationship between the current screen image and the desired screen image according to the first difference image; and testing a display interface of the display terminal according to the first image matching relationship and the second image matching relationship.

In an example embodiment of the present disclosure, calculating the first mean square error between the current screen image and the desired screen image, and determining the first image matching relationship between the current screen image and the desired screen image according to the first mean square error, includes:

obtaining a first pixel value of a first pixel point included in the current screen image, and a second pixel value of a second pixel point of the desired screen image;

calculating a pixel difference between the first pixel value and the second pixel value of the second pixel point corresponding to the first pixel point, and calculating the first mean square error according to the pixel difference; and calculating a first difference relationship between the first mean square error and a first preset threshold, and obtaining the first image matching relationship between the current screen image and the desired screen image according to the first difference relationship.

In an example embodiment of the present disclosure, calculating the first difference image between the current screen image and the desired screen image, and determining the second image matching relationship between the current screen image and the desired screen image according to the first difference image includes:

when it is determined that the first image matching relationship exists, generating the first difference image between the current screen image and the desired screen image according to the pixel difference;

segmenting the first difference image based on a preset image segmentation algorithm to obtain a foreground image and a background image included in the first difference image, and calculating the number of non-zero pixels included in the foreground image; and obtaining the second image matching relationship between the current screen image and the desired screen image according to the number of non-zero pixels.

In an example embodiment of the present disclosure, testing the display interface of the display terminal according to the first image matching relationship and the second image matching relationship includes:

when it is determined that the first image matching relationship exists and the second image matching relationship exists, determining that display function testing of the display interface of the display terminal is passed;

when it is determined that the first image matching relationship does not exist or the second image matching relationship does not exist, determining that the display function testing of the display interface of the display terminal has failed.

In an example embodiment of the present disclosure, the display interface testing method further includes:

in response to an erasing event acting on a preset region in the display interface by a preset event input object, erasing the preset region to obtain a target screen image including an erased region;

obtaining the erased region in the target screen image and an original region in the display interface corresponding to the preset region, and calculating a second mean square error and a second difference image between the erased region and the original region;

determining a first region matching relationship and a second region matching relationship between the erased region and the preset region according to the second mean square error and the second difference image; and according to the first region matching relationship and the second region matching relationship, testing an erasing function that the display interface of the display terminal has.

In an example embodiment of the present disclosure, the display interface testing method further includes:

obtaining a control screenshot corresponding to an interactive control included in an interactive interface, and searching for a matching template page image of the interactive control corresponding to the control screenshot in a preset image template library;

obtaining a coordinate position of the interactive control in the template page image, and sending the coordinate position to a preset event input object;

in response to a touch event on the display interface by the preset event input object based on the coordinate position, obtaining a touch region corresponding to the touch event, and calculating a third mean square error and a third difference image between the touch region and the control screenshot; and determining a first control matching relationship and a second control matching relationship between the touch region and the control screenshot according to the third mean square error and the third difference image, and testing a touch function of the interactive control in the display interface of the display terminal according to the first control matching relationship and the second control matching relationship.

In an example embodiment of the present disclosure, the display interface testing method further includes:

in response to a first input event acting on the display interface by a preset event input object for inputting preset content, generating original content corresponding to the first input event, and performing normalization processing on the original content to obtain normalized content;

calculating a fourth difference image between the display interface and a first target interface including target content, and calculating a sub-content image of each sub-content included in the normalized content according to the fourth difference image;

calculating a fourth mean square error between the sub-content image and a sub-template image of a sub-template content corresponding to the sub-content in the preset content, and determining a content matching relationship between the sub-content image and the sub-template image according to the fourth mean square error; and testing an input function and/or a machine learning function of the display interface of the display terminal according to the content matching relationship.

In an example embodiment of the present disclosure, calculating the sub-content image of each sub-content included in the normalized content according to the fourth difference image includes:

performing grayscale conversion on the fourth difference image to obtain a first binary difference image, and performing image segmentation on the first binary difference image using a preset image segmentation algorithm to obtain a first segmented black-and-white image;

obtaining a first original connected region included in the first segmented black-and-white image, and filtering the first original connected region to obtain a first target connected region;

cropping the first target connected region from the first segmented black-and-white image to obtain a first initial cropping result, and searching for the first pixel point, whose third pixel value is greater than a second preset threshold, in the first initial cropping result based on a first preset search direction; and performing region growing with the first pixel point as a seed point, filling an internal region of a graphic outline that the first initial cropping result has, so as to obtain a first target cropping result, and adjusting a size of the first target cropping result to obtain the sub-content image of each sub-content included in the normalized content.

In an example embodiment of the present disclosure, the original content includes an original graphic and/or an original character;

wherein original graphic includes any one or more of: a rectangle, an ellipse, a triangle, a regular polygon and an irregular polygon.

In an example embodiment of the present disclosure, when the original graphic is the rectangle, after calculating the sub-content image of each sub-content included in the normalized content according to the fourth difference image, the display interface testing method further includes:

obtaining a length value of a longer side of the rectangle and a length value of a shorter side of the rectangle, and calculating a first ratio between the length value of the longer side and the length value of the shorter side;

when it is determined that the first ratio is greater than a third preset threshold, or less than a fourth preset threshold, determining that the original graphic is the rectangle;

when it is determined that the first ratio is between the third preset threshold and the fourth preset threshold, determining that the original graphic is a square.

In an example embodiment of the present disclosure, when the original graphic is the ellipse, after calculating the sub-content image of each sub-content included in the normalized content according to the fourth difference image, the display interface testing method further includes:

obtaining a length value of a first diameter of the ellipse in an ordinate direction and a length value of a second diameter of the ellipse in an abscissa direction, and calculating a second ratio between the length value of the first diameter and the length value of the second diameter;

when it is determined that the first ratio is greater than a third preset threshold, or less than a fourth preset threshold, determining that the original graphic is the ellipse;

when it is determined that the first ratio is between the third preset threshold and the fourth preset threshold, determining that the original graphic is a circle.

In an example embodiment of the present disclosure, the display interface testing method further includes:

in response to a second input event acting on the display interface by a preset event input object for inputting a line shape, generating an original line shape corresponding to the second input event;

calculating a fifth difference image between the display interface and a second target interface including the original line shape, and performing binarization processing on the fifth difference image to obtain a second binary difference image;

performing image segmentation on the second binary difference image using a preset image segmentation algorithm to obtain a second segmented black-and-white image, and obtaining a second original connected region included in the second segmented black-and-white image; and filtering the second original connected region to obtain a second target connected region, and testing a line input function that the display interface of the display terminal has based on the second target connected region.

In an example embodiment of the present disclosure, the line input function includes at least one of: a line color input function, a line smoothness input function, and a line width input function.

In an example embodiment of the present disclosure, when the line input function is the line color input function, testing the line input function that the display interface of the display terminal has based on the second target connected region includes:

traversing each pixel point inside a region in the second target interface corresponding to the second target connected region, obtaining a fourth pixel value of each pixel point inside the region, and calculating a first average value of the fourth pixel value;

calculating a color matching relationship of the original line shape according to the first average value of the fourth pixel value and a target pixel value of the original line shape; and testing the line color input function that the display interface of the display terminal has according to the color matching relationship.

In an example embodiment of the present disclosure, when the line input function is the line width input function, testing the line input function that the display interface of the display terminal has based on the second target connected region includes:

cropping the second target connected region from the second segmented black-and-white image to obtain a second initial cropping result, and scanning the first pixel point, whose fifth pixel value is greater than a second preset threshold, in the second initial cropping result based on a second preset search direction and a preset pixel width;

obtaining a sixth pixel value and a seventh pixel value of two pixel points adjacent to the first pixel point in a horizontal position, and determining a target drawing direction according to the sixth pixel value and the seventh pixel value;

drawing a square that meets a preset condition based on the target drawing direction, and calculating a second average value of a side length of the square that meets the preset condition; and calculating a line width matching relationship of the original line shape according to the second average value and a target line width of the original line shape, and testing the line width input function that the display interface of the display terminal has according to the line width matching relationship.

In an example embodiment of the present disclosure, when the line input function is the line smoothness input function, testing the line input function that the display interface of the display terminal has based on the second target connected region includes:

searching for the first pixel point, whose sixth pixel value is greater than the second preset threshold, in the second initial cropping result based on a first preset search direction, and determining the first pixel point whose sixth pixel value is greater than the second preset threshold in the second initial cropping result as a target pixel point;

calculating first geodesic distances between all pixel points included in the second initial cropping result and the target pixel point, and determining a first endpoint of the original line shape from all pixel points according to the first geodesic distances;

calculating second geodesic distances between all pixel points included in the second initial cropping result and the first endpoint, and determining a second endpoint of the original line shape from all pixel points according to the second geodesic distances; and according to an endpoint position of the first endpoint, an endpoint position of the second endpoint and an endpoint position of a target endpoint of the original line shape, calculating a line smoothness matching relationship of the original line shape, and testing the line smoothness input function that the display interface of the display terminal has according to the line smoothness matching relationship.

In an example embodiment of the present disclosure, the preset event input object includes a mechanical arm.

According to an aspect of the present disclosure, there is provided a display interface testing apparatus, including:

a first image obtaining module configured to obtain a current screen image of a display terminal and a desired screen image corresponding to the current screen image;

a first calculation module configured to calculate a first mean square error between the current screen image and the desired screen image, and determine a first image matching relationship between the current screen image and the desired screen image according to the first mean square error;

a second calculation module configured to calculate a first difference image between the current screen image and the desired screen image, and determine a second image matching relationship between the current screen image and the desired screen image according to the first difference image; and a display interface testing module configured to test a display interface of the display terminal according to the first image matching relationship and the second image matching relationship.

According to an aspect of the present disclosure, there is provided a computer-readable storage medium having a computer program stored thereon. When the computer program is executed by a processor, the display interface testing method according to any one of the above embodiments is implemented.

According to an aspect of the present disclosure, there is provided an electronic device, including:

a processor; and a memory configured to store instructions executable by the processor;

wherein the processor is configured to execute the executable instructions to perform the display interface testing method according to any one of the above embodiments.

It is to be understood that the foregoing general description and the following detailed description are illustrative and explanatory only and are not restrictive of the present disclosure.

BRIEF DESCRIPTION OF THE DRAWINGS

The drawings herein, which are incorporated into the specification and constitute a part of the specification, show embodiments consistent with the present disclosure, and serve to, together with the specification, explain the principles of the present disclosure. Obviously, the drawings described below are only some embodiments of the present disclosure, and for those of ordinary skill in this art, other drawings can be obtained based on these drawings without creative work. In the drawings:

FIG. 1 schematically shows a flowchart of a display interface testing method according to an example embodiment of the present disclosure.

FIG. 2 schematically shows an example diagram of a display terminal according to an example embodiment of the present disclosure.

FIG. 4 schematically shows an example scene diagram of a dot grid writing background according to an example embodiment of the present disclosure.

FIG. 5 schematically shows a flowchart of a method for testing an erasing function included in a display interface of a display terminal according to an example embodiment of the present disclosure.

FIG. 6 schematically shows an example diagram of a scene of a target screen image including an erased region according to an example embodiment of the present disclosure.

FIG. 7 schematically shows a flowchart of a method for testing a touch function of an interactive control included in a display interface of a display terminal according to an example embodiment of the present disclosure.

FIG. 9 schematically illustrates a flowchart of a method for testing an input function and/or a machine learning function of a display interface of a display terminal according to an example embodiment of the present disclosure.

FIG. 10 schematically shows an example diagram of an original character and a normalized character according to an example embodiment of the present disclosure.

FIG. 11 schematically shows a diagram of an example scene of a first initial cropping result according to an example embodiment of the present disclosure.

FIG. 12 schematically shows a diagram of an example scene of a first target cropping result according to an example embodiment of the present disclosure.

FIG. 13 schematically shows a flowchart of a method for testing a line input function of a display interface of a display terminal according to an example embodiment of the present disclosure.

DETAILED DESCRIPTION

Figure 3:
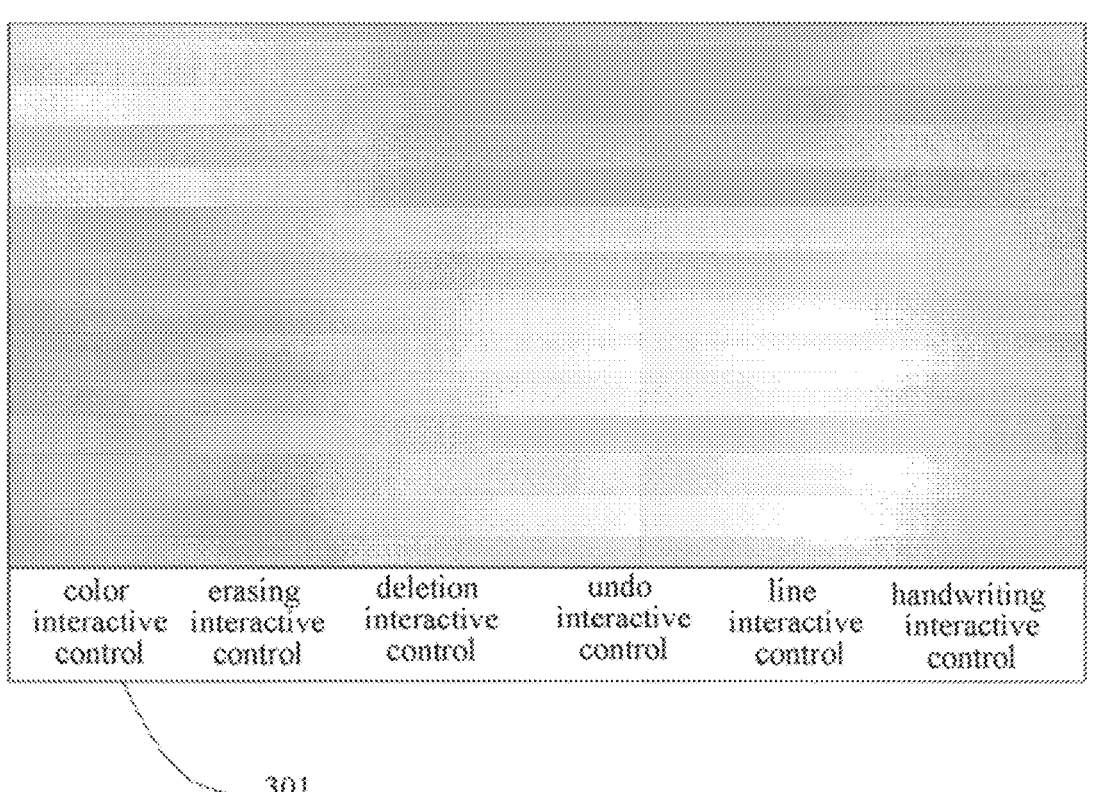
FIG. 3 schematically shows an example scene diagram of a non-dot grid writing background according to an example embodiment of the present disclosure.

Example implementations will now be described more fully with reference to accompanying drawings. However, example implementations can be implemented in a variety of forms and should not be construed as limited to the examples set forth herein; rather, these implementations are provided so that the present disclosure will be more comprehensive and complete to fully convey the concepts of the example implementations to those skilled in the art. The described features, structures, or characteristics may be combined in any suitable manner in one or more implementations.

In addition, the accompanying drawings are only schematic illustrations of the present disclosure and are not necessarily drawn to scale. The same reference numerals in the figures represent the same or similar parts, and their repeated description will be omitted. Some of the block diagrams shown in the accompanying drawings are functional entities and do not necessarily correspond to physically or logically independent entities. These functional entities can be implemented in a form of software, or implemented in one or more hardware modules or integrated circuits, or implemented in different networks and/or processor apparatuses and/or microcontroller apparatuses.

In recent years, the market for all-in-one conference machines has continued to expand. During the production of all-in-one machines, the quality of software and hardware needs to be controlled, such as whether pages at all levels can be normally displayed, whether the writing effect is smooth, and so on. Traditional quality inspection methods require production line workers to constantly click on/tap various function menus for testing, which consumes a lot of manpower.

In view of above, an example implementation first provides a display interface testing method. The method may be run on a display terminal. The display terminal may be used in various scenarios such as conferences, teaching, or business and so on, and the smart interactive tablet has interactive functions such as touch, has a large size (for example, generally larger than 50 inches), and is installed with software for handwriting, wireless screen projection, and remote video conferencing. Of course, those skilled in the art may also run the method in the present disclosure on other platforms (for example, a server, a server cluster, or a cloud server, etc.) as needed, and the example implementation does not specifically limit this. Specifically, referring to FIG. 1, the display interface testing method may include the following steps:

In step S110, a current screen image of the display terminal and a desired screen image corresponding to the current screen image are obtained.

In step S120, a first mean square error between the current screen image and the desired screen image is calculated, and a first image matching relationship between the current screen image and the desired screen image is determined according to the first mean square error.

In step S130, a first difference image between the current screen image and the desired screen image is calculated, and a second image matching relationship between the current screen image and the desired screen image is determined according to the first difference image.

In step S140, a display interface of the display terminal is tested according to the first image matching relationship and the second image matching relationship.

In the display interface testing method, on the one hand, the display function(s) of the display interface of the display terminal can be tested according to the first image matching relationship and the second image matching relationship between the current screen image and the desired screen image, and thus automatic testing of the display interface of the display terminal is realized, and the problem of low testing efficiency caused by manual testing in related art is solved. On the other hand, the first mean square error between the current screen image and the desired screen image is calculated, and the first image matching relationship between the current screen image and the desired screen image is determined according to the first mean square error. Then, the first difference image between the current screen image and the desired screen image is calculated, and the second image matching relationship between the current screen image and the desired screen image is determined according to the first difference image. Finally, according to the first image matching relationship and the second image matching relationship, the display interface of the display terminal is tested. Since the first image matching relationship and the second image matching relationship are considered at the same time in the process of testing the display interface, the problem of low accuracy of the testing result caused by considering only one image matching relationship can be avoided, thereby improving the accuracy of the testing result.

Hereinafter, the display interface testing method according to example embodiments of the present disclosure will be explained and illustrated in detail with reference to the accompanying drawings.

First, the display terminal described in the example embodiments of the present disclosure is explained and illustrated. Specifically, referring to FIG. 2, the display terminal 200 may include a display (the front end) 210, a processor (the back end, which is provided with a corresponding algorithm, and therefore may also be referred to as the algorithm bottom layer) 220, and an input component. The input component may include a touch component. It should be noted that the processor may include a processor provided on a cloud server, or may include a local processor provided on a smart interactive tablet, and this example does not impose any special restrictions on this.

It should be noted here that the display interface testing method disclosed in the example embodiment of the present disclosure can test the display function(s) of the display interface of the display terminal. Of course, it can also test an erasing function that the display interface has, a touch function of an interactive controls included in the display interface, a graphic beautification function (that is, an AI algorithm recognition function) that the display interface of the display terminal has, and a line input function of the display interface of the display terminal. Of course, in actual applications, other functions of the display interface of the display terminal can also be tested, and this example does not impose any special restrictions on this.

Secondly, in the display interface testing method provided in an example embodiment of the present disclosure:

In step S110, a current screen image of the display terminal and a desired screen image corresponding to the current screen image are obtained.

Specifically, in the actual application process, a functional page of each level of the all-in-one machine is pre-configured with specified content by the front end and then displayed. Therefore, when automated testing (also known as automated proofreading) is performed, the front end may pass an expected content image (the desired screen image corresponding to the current screen image) and the current screen (the current screen image) of the all-in-one machine to the algorithm bottom layer. That is, the algorithm bottom layer (the processor) may obtain the current screen image of the display terminal and the desired screen image corresponding to the current screen image from the front end. The current screen image may include those shown in FIG. 3 and FIG. 4. Furthermore, in the current screen image shown in FIG. 3, it is a non-dot grid writing background, that is, a normal writing background board. In the current screen image shown in FIG. 4, it is a dot grid writing background. Also, in the current screen images shown in FIG. 3 and FIG. 4, corresponding interactive control region 301 and interactive control region 401 are displayed below the current screen image, and interactive controls displayed in the interactive control regions may include but are not limited to: a color interactive control, an erasing interactive control, a deletion interactive control, a withdraw interactive control, a line interactive control, a handwriting interactive control, etc. In the specific application process, a corresponding interactive control may be selected according to actual needs, and this example does not impose any special restrictions on this.

In step S120, a first mean square error between the current screen image and the desired screen image is calculated, and a first image matching relationship between the current screen image and the desired screen image is determined according to the first mean square error.

In this example embodiment, calculating of the first mean square error between the current screen image and the desired screen image, and determination of the first image matching relationship between the current screen image and the desired screen image based on the first mean square error can be implemented in the following manner. First, a first pixel value of a first pixel point included in the current screen image and a second pixel value of a second pixel point of the desired screen image are obtained. Secondly, a pixel difference between the first pixel value and the second pixel value of the second pixel point corresponding to the first pixel point is calculated, and the first mean square error is calculated according to the pixel difference. Then, a first difference relationship between the first mean square error and a first preset threshold is calculated, and the first image matching relationship between the current screen image and the desired screen image is obtained according to the first difference relationship.

In an example embodiment, the Mean Square Error (MSE) may be represented by MSE. The mean square error may be used to characterize the average of the sum of squares of the distances of respective data from a true value, that is, the average of the sum of squares of errors. The specific calculation formula of the first mean square error may be shown in the following formula (1):

$$MSE = \frac{1}{n}\sum_{i=1}^{n}(X_{csi,i} - X_{dsi,i})^2 \qquad \text{Formula (1)}$$

where n is the number of pixels included in the current screen image and/or the desired screen image, $X_{csi,i}$ is the first pixel value of the i-th first pixel in the current screen image, and $X_{dsi,i}$ is the second pixel value of the i-th second pixel in the desired screen image. Further, after obtaining the first mean square error, the first image matching relationship can be determined according to the first mean square error. In a specific application process, when the first mean square error is less than a first preset threshold which is set in advance (the threshold can be set to an empirical value of 10 in the example embodiment of the present disclosure), it is considered that the two page images (the current screen image and the desired screen image) may have the first image matching relationship. That is, if the absolute value of the first difference relationship between the first mean square error and the first preset threshold is less than or equal to 0.05 or 0.1, it can be determined that the first image matching relationship exists.

In step S130, a first difference image between the current screen image and the desired screen image is calculated, and a second image matching relationship between the current screen image and the desired screen image is determined according to the first difference image.

In this example embodiment, calculating of the first difference image between the current screen image and the desired screen image, and determination of the second image matching relationship between the current screen image and the desired screen image based on the first difference image can be implemented in the following manner. First, when it is determined that the first image matching relationship exists, the first difference image between the current screen image and the desired screen image is generated based on the pixel difference. Second, the first difference image is segmented based on a preset image segmentation algorithm to obtain a foreground image and a background image included in the first difference image, and the number of non-zero pixels included in the foreground image is calculated. Then, the second image matching relationship between the current screen image and the desired screen image is obtained based on the number of non-zero pixels.

In an example embodiment, when it is determined that the first image matching relationship between the current screen image and the desired screen image exists, it can be considered that the two images are two images that may match each other. Therefore, in order to further improve the accuracy of the testing result, when it is determined that the first image matching relationship exists, the first difference image between the current screen image and the desired screen image can be calculated. In the process of calculating the first difference image, the second pixel value of the second pixel point included in the desired screen image may be subtracted from the first pixel value of the first pixel point included in the current screen image, and then the first difference image between the current screen image and the desired screen image may be obtained according to the difference between the first pixel value and the second pixel value. After obtaining the first difference image, grayscale conversion may be performed on the first difference image, and then the first difference image after the grayscale processing may be segmented based on a preset image segmentation algorithm to obtain a foreground image and a background image included in the first difference image. The preset image segmentation algorithm here may be the maximum inter-class variance method (the OTSU algorithm). Of course, the preset image segmentation algorithm may also be other algorithms, such as a Gaussian filtering algorithm, etc., and this example does not impose special restrictions on this. Further, after obtaining the foreground image, the number of non-zero pixels included in the foreground image can be counted, and finally, according to the number of non-zero pixels, the second image matching relationship between the current screen image and the desired screen image is obtained. If the number of non-zero pixels is less than a preset threshold (the example embodiment of the present disclosure sets the preset threshold to an empirical value of 500), it is considered that the two page images do have a matching relationship (the second image matching relationship exists), and it can be considered that the current screen image and the desired screen image are successfully matched.

In a possible example embodiment, the first image matching relationship and the second image matching relationship may also be calculated separately. That is, regardless of whether the first image matching relationship exists, the second image matching relationship is calculated, and finally a corresponding test is performed based on the first image matching relationship and the second image matching relationship.

In step S140, the display interface of the display terminal is tested according to the first image matching relationship and the second image matching relationship.

In this example embodiment, the testing of the display interface of the display terminal according to the first image matching relationship and the second image matching relationship can be specifically implemented in the following manner. On the one hand, when it is determined that the first image matching relationship exists and the second image matching relationship exists, it is determined that the display function testing of the display interface of the display terminal is passed. On the other hand, when it is determined that the first image matching relationship does not exist or the second image matching relationship does not exist, it is determined that the display function testing of the display interface of the display terminal is not passed. That is, if the first image matching relationship exists and the second image matching relationship exists, it can be considered that the display effect of the current screen image displayed on the display interface of the display terminal is consistent with the desired display effect of the current screen image, and it can be considered that the display function of the display interface of the display terminal has no problem and the testing is passed. If any image matching relationship does not exist, it can be considered that the display function of the display interface has a problem and the testing has failed. If the testing has failed, the display interface in the displaying procedure can be corrected.

FIG. 5 schematically shows a flowchart of a method for testing an erasing function included in a display interface of a display terminal according to an example embodiment of the present disclosure. Specifically, referring to FIG. 5, the method may include the following steps:

In step S510, in response to an erasing event acting on a preset region in the display interface by a preset event input object, the preset region is erased to obtain a target screen image including the erased region.

Specifically, the preset event input object here may be, for example, a mechanical arm, and of course it can also be other input object(s), such as an external input device, a finger, or a wireless stylus pen, etc., and this example does not impose any special restrictions on this. Here, the corresponding event is inputted through a mechanical arm in order to attenuate the influence of human factors in the procedure of testing the display interface of the display terminal, thereby achieving the goal of improving testing efficiency and reducing labor costs while improving the accuracy of the testing result.

Furthermore, in a specific testing procedure, first, the range of the region to be erased may be set and sent to a control unit of the mechanical arm, and then the mechanical arm is controlled to perform erasing in the set range of the region to be erased in the display interface. The obtained target screen image including the erased region may be specifically shown in FIG. 6.

In step S520, the erased region in the target screen image and an original area in the display interface corresponding to the preset region are obtained, and a second mean square error and a second difference image between the erased region and the original region are calculated.

Specifically, after obtaining the target image including the erased region, the display (front end) may pass the erased page (the target screen image including the erased region), the original unwritten page (the display interface) and the corner point coordinates of the specified erased region to the algorithm bottom layer (the processor). Then, the processor crops the erased region and the original region, and calculates the second mean square error and the second difference image between the erased region and the original region. The specific calculation procedure of the second mean square error and the second difference image is similar to the specific calculation procedure of the first mean square error and the first difference image, and will not be repeated here.

In step S530, a first region matching relationship and a second region matching relationship between the erased region and the preset region are determined according to the second mean square error and the second difference image.

Specifically, the specific procedure of determining the first region matching relationship and the second region matching relationship is similar to the specific procedure of determining the first image matching relationship and the second image matching relationship, and will not be further repeated here.

In step S540, the erasing function of the display interface of the display terminal is tested according to the first region matching relationship and the second region matching relationship.

Specifically, if both the first region matching relationship and the second region matching relationship exist, it is determined that testing of the erasing function, which the display interface of the display terminal has, is passed (that is, in the specific application procedure, the erasing function can be performed normally). If any one of the first region matching relationship or the second region matching relationship does not exist, it is determined that the testing of the erasing function, which the display interface of the display terminal has, is not passed. If the testing is not passed, further correction is required.

FIG. 7 schematically shows a flowchart of a method for testing a touch function of an interactive control included in a display interface of a display terminal according to an example embodiment of the present disclosure. Specifically, referring to FIG. 7, the method may include the following steps:

In step S710, a control screenshot corresponding to an interactive control included in an interactive interface is obtained, and a matching template page image of the interactive control corresponding to the control screenshot is searched for in a preset image template library.

Figure 8:
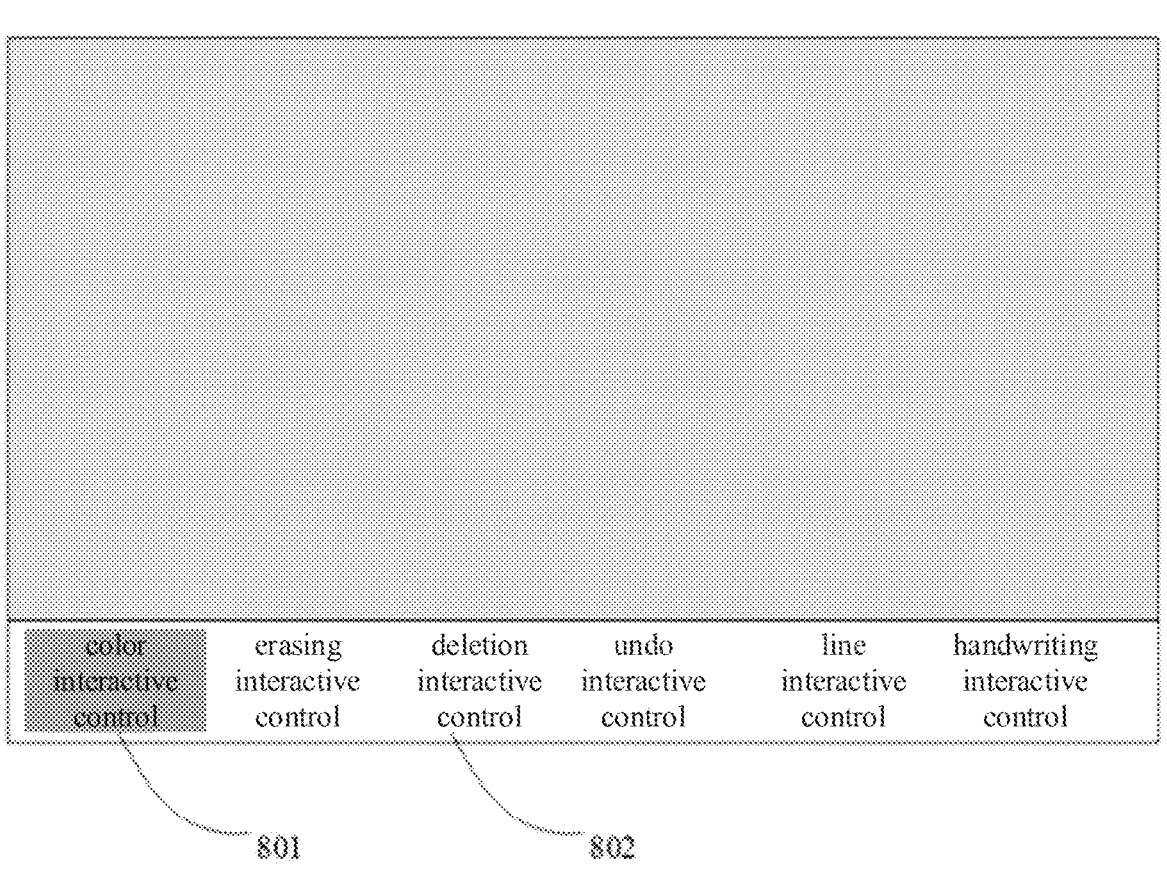
FIG. 8 schematically shows an example scene diagram of an interactive control in two different states according to an example embodiment of the present disclosure.

Specifically, when it is needed to test one or more interactive controls included in the display interface, first, the front end may capture control screenshot(s) of one or more interactive controls to be tested included in the display interface, and send the control screenshot(s) of the one or more interactive controls to be tested and the display interface including the one or more interactive controls to be tested to the processor. Then, the processor searches for matching template page image(s) corresponding to the control screenshot(s) in the preset image template library. It should be noted here that an interactive control may include two states, one is a selected state and the other is an unselected state, and therefore, when sending the control screenshot of the interactive control to be tested, the control screenshots of both states may be sent to the processor. For the specific state diagram of an interactive control in two different states, reference may be made to FIG. 8. As shown in FIG. 8, the selected state may be as shown in 801, and the unselected state may be as shown in 802.

In step S720, a coordinate position of the interactive control in the template page image is obtained, and the coordinate position is sent to a preset event input object.

Specifically, after obtaining the corresponding template page image, the coordinate position of the interactive control in the template page image may be obtained, and then the coordinate position is sent to the preset event input object. The preset event input object can be a mechanical arm. Of course, it may also be other input objects, such as an external input device, a finger, or a wireless stylus pen, etc., and this example does not impose special restrictions on this. Here, the corresponding event is inputted through a mechanical arm in order to attenuate the influence of human factors in the procedure of testing the display interface of the display terminal, thereby achieving the goal of improving testing efficiency and reducing labor costs while improving the accuracy of the testing result.

In step S730, in response to a touch event acting on the display interface by the preset event input object based on the coordinate position, a touch region corresponding to the touch event is obtained, and a third mean square error and a third difference image between the touch region and the control screenshot are calculated.

Specifically, after the mechanical arm receives the coordinate position, the mechanical arm may touch the region corresponding to the coordinate position in the display interface based on the coordinate position. Then, the front end may obtain the touch region and send the touch region to the processor. After the processor receives the touch region, the processor may calculate the third mean square error and the third difference image between the touch region and the control screenshot to date. The specific calculation procedure of the third mean square error and the third difference image is similar to the calculation procedure of the first mean square error and the first difference image, and will not be further repeated here. It should be noted here that, the control screenshots may include a screenshot of a control in a selected state and a screenshot of the control in an unselected state, and therefore, in the specific calculation procedure, it is needed to calculate the corresponding third mean square error and third difference image respectively.

In step S740, a first control matching relationship and a second control matching relationship between the touch region and the control screenshot are determined according to the third mean square error and the third difference image, and the touch function of the interactive control in the display interface of the display terminal is tested according to the first control matching relationship and the second control matching relationship.

Specifically, after obtaining the third mean square error and the third difference image, the first control matching relationship and the second control matching relationship may be calculated. The specific calculation procedure of the first control matching relationship and the second control matching relationship is similar to the specific calculation procedure of the first image matching relationship and the second image matching relationship, and will not be further repeated here. Also, after obtaining the first control matching relationship and the second control matching relationship, the touch function of the interactive control in the display interface of the display terminal may be tested. If both the first control matching relationship and the second control matching relationship exist, it is determined that testing of the touch function of the interactive control in the display interface of the display terminal is passed, that is, normal interaction can be carried out. If any of the first control matching relationship or the second control matching relationship does not exist, it is considered that testing of the touch function of the interactive control in the display interface of the display terminal is not passed, and further correction of the touch function of the interactive control is required.

It should be noted that the method for automatically checking function button(s) on the all-in-one machine page shown in FIG. 7 supports rapid recognition of the position of a specified button. In the specific application process, the front end passes the screenshot(s) to be recognized and the specified button screenshot(s) to the algorithm bottom layer. Since displaying of a button is generally divided into two states, selected and unselected states, the screenshots in both states can be passed. Also, the algorithm bottom layer uses the button screenshots to perform template matching for the screen page. When a matching score reaches a preset threshold (the specific threshold may be set to an empirical value of 0.99), the position of the button is found. Further, the algorithm layer passes the coordinates of the upper left and lower right corners of the matching button region to the controller of the mechanical arm to control the mechanical arm to click/tap to select the button. Then, with the page verification function, the method can realize the automatic testing of whether the button click/tap function is normal.

FIG. 9 schematically shows a flowchart of a method for testing an input function and/or a machine learning function of a display interface of a display terminal according to an example embodiment of the present disclosure. Specifically, referring to FIG. 9, the method may include the following steps:

In step S910, in response to a first input event acting on the display interface by a preset event input object for inputting preset content, original content corresponding to the first input event is generated, and normalization processing is performed on the original content to obtain normalized content.

Specifically, the display terminal (i.e., the all-in-one conference machine, or all-in-one machine) in the example embodiment of the present disclosure provides an AI (Artificial Intelligence) graphic or character recognition function, and the AI algorithm can recognize a handwritten graphic or character and replace it with a beautified graphic template or a character template. Therefore, in the procedure of testing the AI function, first, in response to the first input event of inputting preset content by the preset event input object acting on the display interface, the original content corresponding to the first input event may be generated. The preset event input object is a mechanical arm, and the original content may include an original graphic, an original character, etc. The original graphic may include a rectangle, an ellipse, a triangle, a regular polygon, an irregular polygon, etc., and of course, other content may also be included, and this example does not impose special restrictions on this. Further, after the original content is obtained, normalization processing may be performed on the original content to obtain normalized content. Taking the original content being an original character as an example, the original character and the normalized character may be as shown in FIG. 10.

In step S920, a fourth difference image between the display interface and a first target interface including the target content is calculated, and a sub-content image of each sub-content included in the normalized content is calculated according to the fourth difference image.

In this example embodiment, first, the fourth difference image between the first target interface including the target content and the display interface is calculated. A specific calculation procedure of the fourth difference image is similar to that of the first difference image and is not repeated here. Further, after obtaining the first difference image, the sub-content image of each sub-content included in the normalized content may be calculated according to the fourth difference image. The specific calculation procedure may be implemented in the following manner. First, grayscale conversion is performed on the fourth difference image to obtain a first binary difference image, and image segmentation is performed on the first binary difference image using a preset image segmentation algorithm to obtain a first segmented black-and-white image. Second, a first original connected region included in the first segmented black-and-white image is obtained, and the first original connected region is filtered to obtain a first target connected region. Then, the first target connected region is cropped from the first segmented black-and-white image to obtain a first initial cropping result, and the first pixel point whose third pixel value is greater than a second preset threshold in the first initial cropping result is searched based on a first preset search direction. Finally, region growing is performed with the first pixel point as a seed point, and an internal region of a graphic outline, which the first initial cropping result has, is filled to obtain a first target cropping result, and the size of the first target cropping result is adjusted to obtain the sub-content image of each sub-content included in the normalized content.

In some example embodiments, in the specific calculation procedure of the sub-content image, first, the fourth difference image may be converted into a grayscale image and then binary segmented using the OTSU algorithm to obtain the first segmented black-and-white image. Second, the first original connected region is extracted from the first segmented black-and-white image, and the connected region with an area smaller than a specified threshold (in this example embodiment, the threshold may be set to an empirical value of 600) is filtered out to obtain a first target connected region. Further, the regions corresponding to all the first target connected regions are cropped from the entire black-and-white image to obtain the first initial cropping result. The obtained first initial cropping result may be specifically shown in FIG. 11. Further, for the first initial cropping result corresponding to each first target connected region, the first pixel point whose third pixel value is not zero in the first initial cropping result is searched from top to bottom (the first preset search direction). Further, the first pixel point is used as a seed point to start region growing, the internal region of the graphic outline is filled to obtain the first target cropping result. The obtained first target cropping result may be specifically shown in FIG. 12. Finally, the size of the first target cropping result is adjusted (Resize) to a size of 256*256 to get the sub-content image.

In an example embodiment, when the original graphic is a rectangle, after calculating the sub-content image of each sub-content included in the normalized content according to the fourth difference image, the display interface testing method further includes: first, obtaining a length value of a longer side of the rectangle and a length value of a shorter side of the rectangle, and calculating a first ratio between the length value of the longer side and the length value of the shorter side; secondly, when it is determined that the first ratio is greater than a third preset threshold or less than a fourth preset threshold, determining that the original graphic is a rectangle; finally, when it is determined that the first ratio is between the third preset threshold and the fourth preset threshold, determining that the original graphic is a square. In another example embodiment, when the original graphic is an ellipse, after calculating the sub-content image of each sub-content included in the normalized content according to the fourth difference image, the display interface testing method further includes: first, obtaining a length value of a first diameter of the ellipse in an ordinate direction and a length value of a second diameter of the ellipse in an abscissa direction, and calculating a second ratio between the length value of the first diameter and the length value of the second diameter; secondly, when it is determined that the first ratio is greater than a third preset threshold or less than a fourth preset threshold, determining that the original graphic is an ellipse; finally, when it is determined that the first ratio is between the third preset threshold and the fourth preset threshold, determining that the original graphic is a circle. That is, in a specific application procedure, a square and a rectangle, a circle and an ellipse are distinguished in a length-to-width ratio, but the example embodiment of the present disclosure does not distinguish between a square and a rectangle, a circle and an ellipse in the above recognition procedure; instead, after obtaining the recognition result, the embodiment distinguishes them according to the length-to-width ratio in the cropped result image, and considers that a square with a length-to-width ratio greater than a specified threshold (the third preset threshold set in the example embodiment of the present disclosure may be an empirical value of 0.9, and the fourth preset threshold may be an empirical value of 1.1) is a rectangle, and a circle with a length-to-width ratio greater than a specified threshold is an ellipse. The distinction based on this method is simple and effective, and in the preliminary recognition procedure, it only needs to compare the target graphic with the square and circle templates respectively, which saves the amount of calculation.

In step S930, a fourth mean square error between the sub-content image and a sub-template image of a sub-template content corresponding to the sub-content in the preset content is calculated, and a content matching relationship between the sub-content image and the sub-template image is determined according to the fourth mean square error.

Specifically, after the sub-content image is obtained, the fourth mean square error between the sub-content image and the sub-template image may be calculated, and then the fourth mean square error between the sub-content image and the sub-template image may be determined according to the fourth mean square error. The size of the character template image is consistent with the size of the sub-content image, which may be 256*256, and of course may also be of other sizes, and this example does not impose any special restrictions on this. Also, the specific calculation procedure of the fourth mean square error is similar to the specific calculation procedure of the first mean square error, which will not be repeated here. Further, after the fourth mean square error is obtained, the content matching relationship between the sub-content image and the character template image may be determined according to the fourth mean square error. In the procedure of determining the content matching relationship, if the fourth mean square error is less than a specified threshold, it can be considered that the content matching relationship exists, that is, it can be considered that the image drawn by the mechanical arm is the corresponding template figure. The specified threshold here may be set to an empirical value of 5000 according to actual needs, and of course it can also be set to other values, and this example does not impose any special restrictions on this.

In step S940, the input function and/or the machine learning function of the display interface of the display terminal is tested according to the content matching relationship.

Specifically, after obtaining the content matching relationship, the input function and/or machine learning function of the display interface of the display terminal may be tested according to the content matching relationship. That is, if the content matching relationship exists, it can be considered that testing of the input function and/or machine learning function of the display interface of the display terminal is passed, and in actual applications, input can be performed and input content can be converted into standard graphic(s) or standard character(s) for display. If the content matching relationship does not exist, it is considered that testing of the input function and/or machine learning function of the display interface of the display terminal is not passed, and further correction is required.

FIG. 13 schematically shows a flowchart of a method for testing a line input function of a display interface of a display terminal according to an example embodiment of the present disclosure. Specifically, referring to FIG. 13, the method may include the following steps:

In step S1310, in response to a second input event acting on the display interface by a preset event input object for inputting a line shape, an original line shape corresponding to the second input event is generated.

Figure 14:
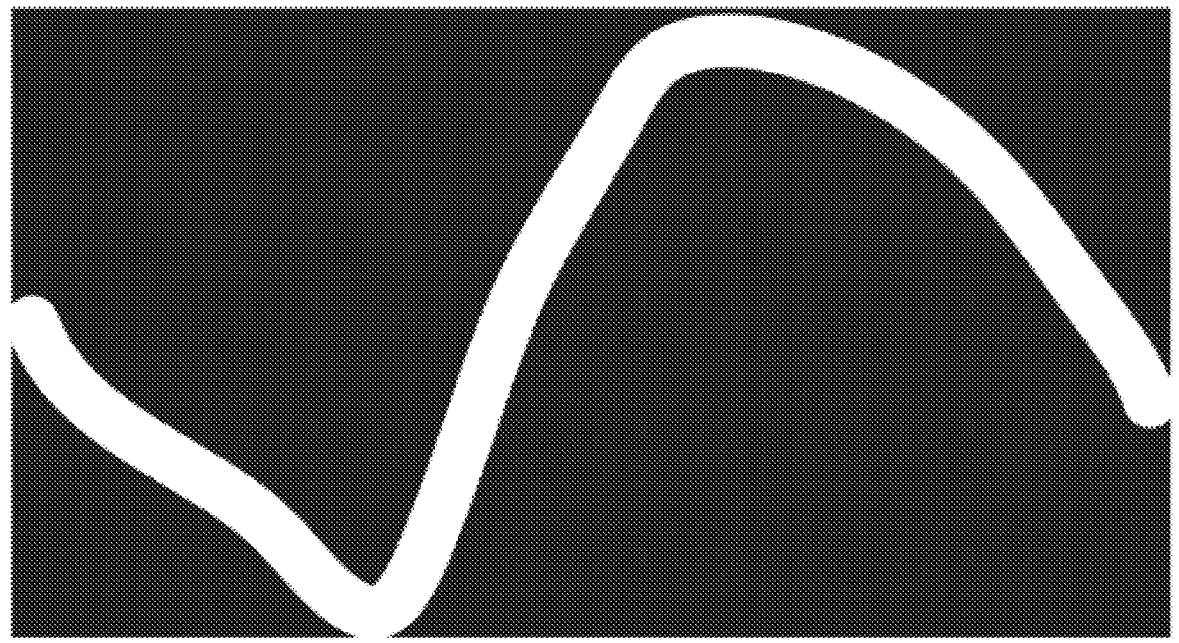
FIG. 14 schematically shows a diagram of an example scene of a specific shape of an original line according to an example embodiment of the present disclosure.

Specifically, the example embodiment of the present disclosure also provides a function of checking a handwritten line on the all-in-one machine, so as to test the line input function in the all-in-one machine to ensure that when a user inputs a line using the all-in-one machine, the functions such as line color, line smoothness and line width can be guaranteed. In the specific test procedure, the mechanical arm (the preset event input object) may be controlled to write in a specified region on the all-in-one machine screen. In the procedure of line input, one mechanical arm input may be controlled for inputting, or multiple mechanical arms input may be controlled at the same time for inputting, and this example does not impose special restrictions on this. Further, when the display receives the line input event (the second input event) of the mechanical arm(s), the original line shape corresponding to the second input event may be generated. The original line shape may be specifically shown in FIG. 14.

In step S1320, a fifth difference image between a second target interface including the original line shape and the display interface is calculated, and binarization processing is performed on the fifth difference image to obtain a second binary difference image.

Specifically, after obtaining the original line shape, the display may send the second target interface including the original line shape and the display interface (the screenshot of the original screen on which no handwriting is performed) to the algorithm bottom layer. The processing flow of the algorithm bottom layer is as follows: calculating the fifth difference image of the two images (the second target interface and the display interface), where the specific calculation procedure of the fifth difference image is similar to the specific calculation procedure of the first difference image and will not be further elaborated here; then, performing binarization processing (that is, grayscale processing) on the fifth difference image to obtain the second binary difference image.

In step S1330, image segmentation is performed on the second binary difference image using a preset image segmentation algorithm to obtain a second segmented black-and-white image, and a second original connected region included in the second segmented black-and-white image is obtained.

Specifically, after obtaining the second binary difference image, the preset image segmentation algorithm (the maximum inter-class variance OTSU algorithm) may be used to perform image segmentation on the second binary difference image to obtain the second segmented black-and-white image. Then, the second original connected region(s) included in the second segmented black-and-white image is(are) extracted.

In step S1340, the second original connected region(s) is(are) filtered to obtain a second target connected region, and the line input function, which the display interface of the display terminal has, is tested based on the second target connected region. The line input function includes at least one of: a line color input function, a line smoothness input function, and a line width input function.

Specifically, after obtaining the second original connected region(s), the second original connected region(s) may be filtered to filter out second original connected region(s) whose area is less than a specified threshold (the specified threshold may be set to be an empirical value of 600 or other value, and this example does not impose any special restrictions on this) to obtain the second target connected region(s). Further, after obtaining the second target connected region(s), the line input function, which the display interface of the display terminal has, can be tested based on the second target connected region. Testing of the line input function may include the following aspects:

On the one hand, when the line input function is the line color input function, testing the line input function which the display interface of the display terminal has based on the second target connected region may be implemented in the following manner. First, each pixel point inside a region in the second target interface corresponding to the second target connected region is traversed, a fourth pixel value of each pixel point inside the region is obtained, and the first average value of the fourth pixel value is calculated. Secondly, a color matching relationship of the original line shape is calculated according to the first average value of the fourth pixel value and a target pixel value of the original line shape. Finally, the line color input function, which the display interface of the display terminal has, is tested according to the color matching relationship. That is, in the procedure of testing the line color input function, for each second target connected region, the fourth pixel value of each pixel point inside the region in the screenshot image after writing (the second target interface including the original line shape) may be traversed, and the average value of three color channels of all pixels may be calculated (that is, the first average value of all fourth pixel values may be calculated), the extracted color value is compared with the target pixel value of the original line shape to obtain the color matching relationship, and the line color input function, which the display interface of the display terminal has, is tested based on the color matching relationship.

It should be noted here that, in the procedure of comparing the first average value and the target pixel value, a mean square error and/or a difference image between the first average value and the target pixel value may be calculated to determine the color matching relationship. At the same time, if the color matching relationship exists, it can be determined that testing of the line color input function is passed; if the color matching relationship does not exist, it can be determined that testing of the line color input function is not passed; if the testing is not passed, correction needs to be performed again.

Figure 15:
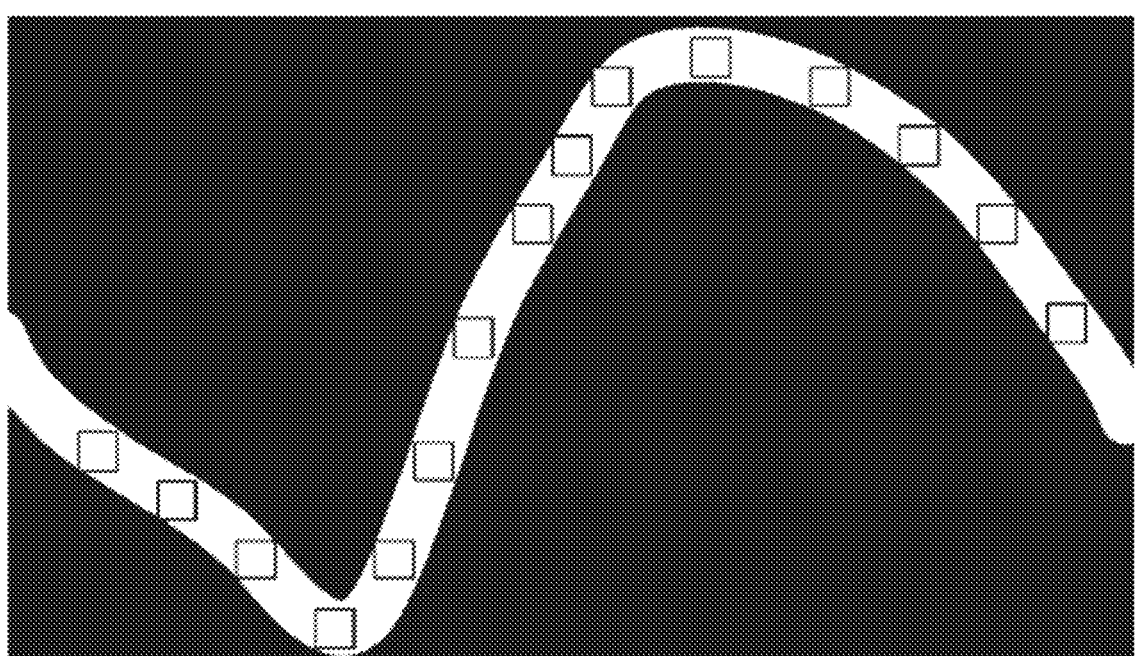
FIG. 15 schematically shows an example diagram of a square included in an original line according to an example embodiment of the present disclosure.

On the other hand, when the line input function is the line width input function, testing the line input function which the display interface of the display terminal has based on the second target connected region may be implemented in the following manner. First, the second target connected region is cropped from the second segmented black-and-white image to obtain a second initial cropping result, and the first pixel point whose fifth pixel value is greater than a second preset threshold in the second initial cropping result is scanned based on a second preset search direction and a preset pixel width. Secondly, a sixth pixel value and a seventh pixel value of two pixel points adjacent to the first pixel point in the horizontal position are obtained, and a target drawing direction is determined according to the sixth pixel value and the seventh pixel value. Then, a square that meets a preset conditions is drawn based on the target drawing direction, and a second average value of a side length of the square that meets the preset conditions is calculated. Finally, a line width matching relationship of the original line shape is calculated based on the second average value and a target line width of the original line shape, and the line width input function, which the display interface of the display terminal has, is tested according to the line width matching relationship. That is, in the procedure of line width check, for each second target connected region, the corresponding region may be cut out from the second segmented black-and-white image to obtain a second initial cropping result. Then, the second initial cropping result is scanned every 10 pix (the preset pixel width) from left to right (the second preset search direction) to find the first non-zero pixel point on each scan line. The pixel values (the sixth pixel value and the seventh pixel value) on both sides of the first pixel point in the horizontal direction are viewed, and a non-zero direction (the target drawing direction, if the left pixel is not zero, then the direction is toward the lower left, and vice versa) is selected to draw the largest square (the square meeting the preset condition) to make the square fall entirely within the line region. As shown in FIG. 15, for all scanned squares, the second average value of the lengths of sides of all squares is calculated as the line width. Further, the line width matching relationship of the original line shape may be calculated based on the second average value and the target line width, and the line width input function which the display interface of the display terminal has may be tested based on the line width matching relationship.

It should be noted that calculating of the line width matching relationship between the second average value and the target line width may be implemented by a mean square error between the second average value and the target line width, or by other methods, and this example does not impose any special restrictions on this. In addition, through line width check, it is not only possible to confirm whether the all-in-one machine makes selection of different line widths take effect; in addition, for the handwriting beautification algorithm on the all-in-one machine, it is usually required to adjust the line width according to the writing pressure and speed to achieve the simulation effect. The present disclosure also provides the technical support for automated testing in this scenario.

On the other hand, when the line input function is the line smoothness input function, testing the line input function which the display interface of the display terminal has based on the second target connected region may be implemented in the following manner. First, the first pixel point whose sixth pixel value is greater than the second preset threshold in the second initial cropping result is searched based on a first preset search direction, and the first pixel point whose sixth pixel value is greater than the second preset threshold in the second initial cropping result is used as the target pixel point. Secondly, a first geodesic distances between all the pixels included in the second initial cropping result and the target pixel point are calculated, and a first endpoint of the original line shape is determined from all the pixels according to the first geodesic distances. Then, second geodesic distances between all the pixels included in the second initial cropping result and the first endpoint are calculated, and a second endpoint of the original line shape is determined from all the pixels according to the second geodesic distances. Finally, a line smoothness matching relationship of the original line shape is calculated according to an endpoint position of the first endpoint, an endpoint position of the second endpoint and an endpoint position of a target endpoint of the original line shape, and the line smoothness input function, which the display interface of the display terminal has, is tested according to the line smoothness matching relationship.

Figure 16:
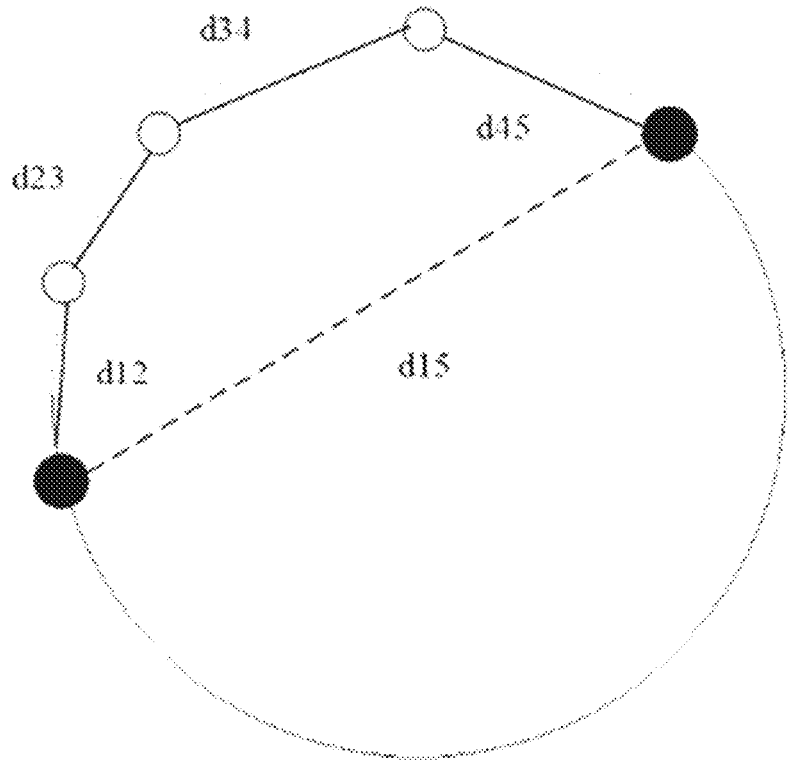
FIG. 16 schematically shows a diagram of an example scene of a geodesic distance according to an example embodiment of the present disclosure.

In an example embodiment, testing the line smoothness input function in the line input function may also be understood as checking the endpoints of the line. Specifically, in the procedure of checking the endpoints of the line, for each second target connected region, the corresponding second target connected region is cut out from the second segmented black-and-white image to obtain the second initial cut result. Then, the first pixel point whose pixel value is not 0 (this can also be understood as a pixel point whose pixel value is greater than zero) in the second initial cut result is searched from top to bottom (the first preset search direction), and the first pixel point is used as the target pixel point. Further, the first geodesic distances between all points of the second initial cut result and the target pixel point are calculated (a first geodesic distance may be specifically shown in FIG. 16); the point with the farthest first geodesic distance from the target pixel is an endpoint of the line (i.e., the first endpoint). Then, the second geodesic distances of all pixels in the image and the first endpoint are calculated, and the point with the farthest second geodesic distance is selected as the second endpoint. Finally, according to the endpoint position of the first endpoint, the endpoint position of the second endpoint, and the endpoint position of the target endpoint of the original line shape, the line smoothness matching relationship of the original line shape is calculated, and the line smoothness input function, which the display interface of the display terminal has, is tested according to the line smoothness matching relationship. In addition, by comparing the actual written line endpoint with the target endpoint position, it is possible to check whether the line is broken, which is of great significance, especially for writing on an edge of the screen of the all-in-one machine.

It should be noted that the word "geodesic" comes from geodesy, which is a discipline that measures the size and shape of the earth. The original meaning of geodesic is the shortest path between two points on the earth's surface. Therefore, the geodesic distance originally refers to the shortest distance between two points on the earth's surface. But, this concept was then extended to the measurement of mathematical space. For example, in graph theory, geodesic distance is the shortest path between two nodes in a graph, which is different from the Euclidean distance commonly used in geometric space, which is the shortest distance between two points. Specifically, in FIG. 16, the Euclidean distance of the two black points is the length d15 of the line segment represented by the dotted line, and the geodesic distance, as the shortest distance of the actual path, should be the minimum sum of the distances of the solid line segments along the way, that is, d12+d23+d34+d45. Further, in a three-dimensional grid, the geodesic distance is the distance between two vertices along the shortest path of the grid surface. In addition, to calculate the geodesic distance of two points in a three-dimensional point cloud, first, it is needed to use all the points in the point cloud to construct a graph with a surface structure similar to a grid, and then find the shortest path between two points in the graph to calculate the geodesic distance.

So far, the method for testing the display interface in the example embodiments of the present disclosure may be completed. Based on the above-mentioned content, it can be known that the method for testing the display interface in the example embodiments of the present disclosure has at least the following advantages. On the one hand, the method for testing the display interface in the example embodiments of the present disclosure can be a method for automatically proofreading a page on an all-in-one machine. This method can not only quickly confirm whether the displaying of function pages at all levels is accurate, but also support the verification of the erasing function of the writing page. On the other hand, the method for testing the display interface in the example embodiments of the present disclosure can be a method for automatically checking the function buttons on a page of the all-in-one machine, supporting the rapid recognition of the position of a specified button, thereby controlling the mechanical arm to perform a selection operation by clicking/tapping. On the other hand, the method for testing the display interface in the example embodiments of the present disclosure can recognize the beautification graphics on the all-in-one machine. Also, for the AI graphic recognition function on the all-in-one machine, the method can quickly check whether the recognized graphics are accurate. Further, the method for testing the display interface in the example embodiments of the present disclosure can check the handwritten lines on the all-in-one machine, and realize the verification of line color, line smoothness and line width.

Figure 17:
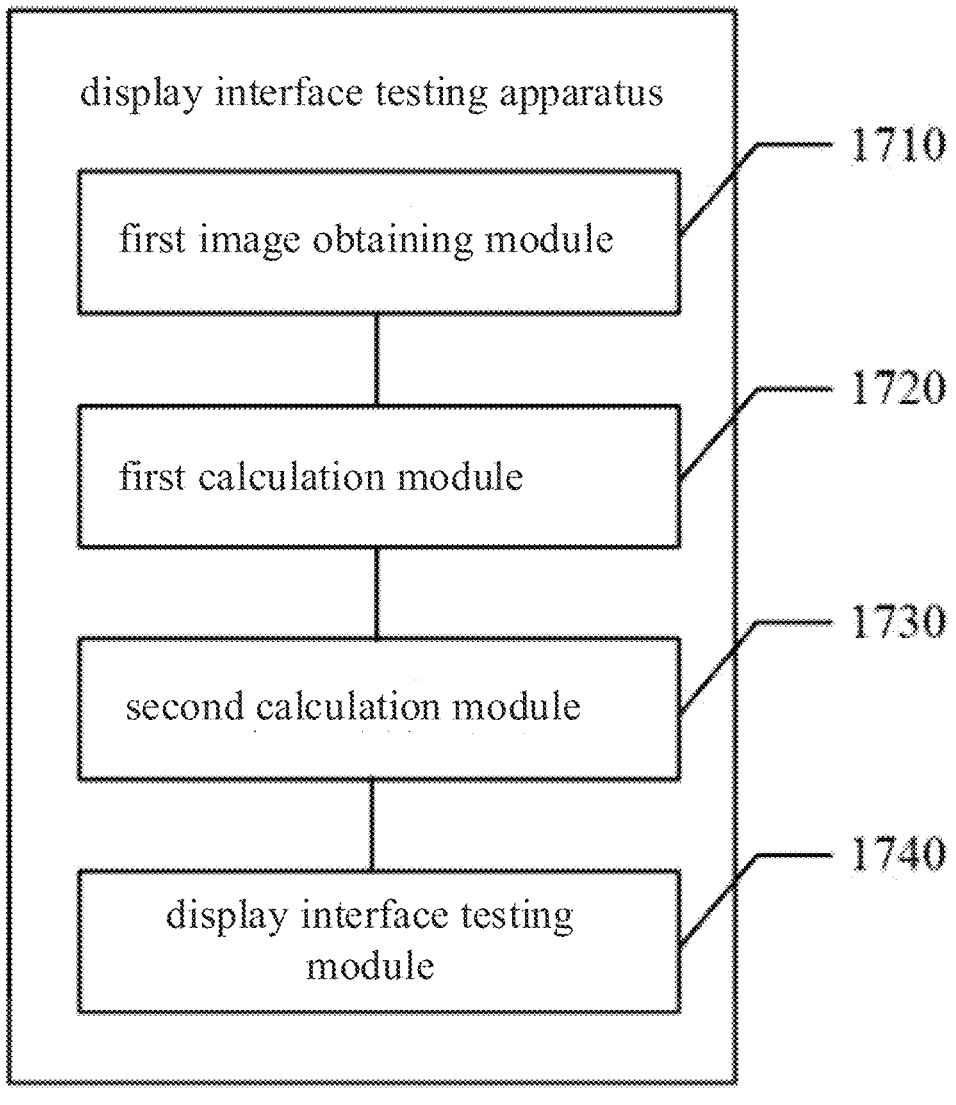
FIG. 17 schematically shows a block diagram of a display interface testing apparatus according to an example embodiment of the present disclosure.

An example embodiment of the present disclosure also provides a display interface testing apparatus. Specifically, referring to FIG. 17, the display interface testing apparatus may include a first image obtaining module 1710, a first calculation module 1720, a second calculation module 1730, and a display interface testing module 1740.

The first image obtaining module 1710 may be configured to obtain a current screen image of a display terminal and a desired screen image corresponding to the current screen image.

The first calculation module 1720 may be configured to calculate a first mean square error between the current screen image and the desired screen image, and determine a first image matching relationship between the current screen image and the desired screen image according to the first mean square error.

The second calculation module 1730 may be configured to calculate a first difference image between the current screen image and the desired screen image, and determine a second image matching relationship between the current screen image and the desired screen image according to the first difference image.

The display interface testing module 1740 may be configured to test a display interface of the display terminal according to the first image matching relationship and the second image matching relationship.

In an example embodiment of the present disclosure, calculating the first mean square error between the current screen image and the desired screen image, and determining the first image matching relationship between the current screen image and the desired screen image according to the first mean square error, includes:

obtaining a first pixel value of a first pixel point included in the current screen image, and a second pixel value of a second pixel point of the desired screen image;

calculating a pixel difference between the first pixel value and the second pixel value of the second pixel point corresponding to the first pixel point, and calculating the first mean square error according to the pixel difference; and calculating a first difference relationship between the first mean square error and a first preset threshold, and obtaining the first image matching relationship between the current screen image and the desired screen image according to the first difference relationship.

In an example embodiment of the present disclosure, calculating the first difference image between the current screen image and the desired screen image, and determining the second image matching relationship between the current screen image and the desired screen image according to the first difference image includes:

when it is determined that the first image matching relationship exists, generating the first difference image between the current screen image and the desired screen image according to the pixel difference;

segmenting the first difference image based on a preset image segmentation algorithm to obtain a foreground image and a background image included in the first difference image, and calculating the number of non-zero pixels included in the foreground image; and obtaining the second image matching relationship between the current screen image and the desired screen image according to the number of non-zero pixels.

In an example embodiment of the present disclosure, testing the display interface of the display terminal according to the first image matching relationship and the second image matching relationship includes:

when it is determined that the first image matching relationship exists and the second image matching relationship exists, determining that display function testing of the display interface of the display terminal is passed;

when it is determined that the first image matching relationship does not exist or the second image matching relationship does not exist, determining that the display function testing of the display interface of the display terminal has failed.

In an example embodiment of the present disclosure, the display interface testing apparatus further includes:

a first event response module configured to, in response to an erasing event acting on a preset region in the display interface by a preset event input object, erase the preset region to obtain a target screen image including an erased region;

a third calculation module configured to obtain the erased region in the target screen image and an original region in the display interface corresponding to the preset region, and calculate a second mean square error and a second difference image between the erased region and the original region;

a fourth calculation module configured to determine a first region matching relationship and a second region matching relationship between the erased region and the preset region according to the second mean square error and the second difference image; and an erasing function testing module configured to, according to the first region matching relationship and the second region matching relationship, test an erasing function that the display interface of the display terminal has.

In an example embodiment of the present disclosure, the display interface testing apparatus further includes:

a template page image matching module configured to obtain a control screenshot corresponding to an interactive control included in the interactive interface, and match a template page image of the interactive control corresponding to the control screenshot in a preset image template library;

a coordinate position sending module configured to obtain a coordinate position of the interactive control in the template page image, and send the coordinate position to a preset event input object;

a second event response module configured to, in response to a touch event on the display interface by the preset event input object based on the coordinate position, obtain a touch region corresponding to the touch event, and calculate a third mean square error and a third difference image between the touch region and the control screenshot; and a touch function testing module configured to determine a first control matching relationship and a second control matching relationship between the touch region and the control screenshot according to the third mean square error and the third difference image, and test a touch function of the interactive control in the display interface of the display terminal according to the first control matching relationship and the second control matching relationship.

In an example embodiment of the present disclosure, the display interface testing apparatus further includes:

a third event response module configured to, in response to a first input event acting on the display interface by a preset event input object for inputting preset content, generate original content corresponding to the first input event, and performing normalization processing on the original content to obtain normalized content;

a fifth calculation module configured to calculate a fourth difference image between the display interface and a first target interface including target content, and calculate a sub-content image of each sub-content included in the normalized content according to the fourth difference image;

a sixth calculation module configured to calculate a fourth mean square error between the sub-content image and a sub-template image of a sub-template content corresponding to the sub-content in the preset content, and determining a content matching relationship between the sub-content image and the sub-template image according to the fourth mean square error; and an input function testing module configured to test an input function and/or a machine learning function of the display interface of the display terminal according to the content matching relationship.

In an example embodiment of the present disclosure, calculating the sub-content image of each sub-content included in the normalized content according to the fourth difference image included:

performing grayscale conversion on the fourth difference image to obtain a first binary difference image, and performing image segmentation on the first binary difference image using a preset image segmentation algorithm to obtain a first segmented black-and-white image;

obtaining a first original connected region included in the first segmented black-and-white image, and filtering the first original connected region to obtain a first target connected region;

cropping the first target connected region from the first segmented black-and-white image to obtain a first initial cropping result, and searching for the first pixel point, whose third pixel value is greater than a second preset threshold, in the first initial cropping result based on a first preset search direction; and performing region growing with the first pixel point as a seed point, filling an internal region of a graphic outline that the first initial cropping result has, so as to obtain a first target cropping result, and adjusting a size of the first target cropping result to obtain the sub-content image of each sub-content included in the normalized content.

In an example embodiment of the present disclosure, the original content includes an original graphic and/or an original character;

wherein original graphic includes any one or more of: a rectangle, an ellipse, a triangle, a regular polygon and an irregular polygon.

In an example embodiment of the present disclosure, when the original graphic is the rectangle, the sixth calculation module may be further configured to:

obtain a length value of a longer side of the rectangle and a length value of a shorter side of the rectangle, and calculating a first ratio between the length value of the longer side and the length value of the shorter side;

when it is determined that the first ratio is greater than a third preset threshold, or less than a fourth preset threshold, determine that the original graphic is the rectangle;

when it is determined that the first ratio is between the third preset threshold and the fourth preset threshold, determine that the original graphic is a square.

In an example embodiment of the present disclosure, when the original graphic is the ellipse, the sixth calculation module may be further configured to:

obtain a length value of a first diameter of the ellipse in an ordinate direction and a length value of a second diameter of the ellipse in an abscissa direction, and calculate a second ratio between the length value of the first diameter and the length value of the second diameter;

when it is determined that the first ratio is greater than a third preset threshold, or less than a fourth preset threshold, determine that the original graphic is the ellipse;

when it is determined that the first ratio is between the third preset threshold and the fourth preset threshold, determine that the original graphic is a circle.

In an example embodiment of the present disclosure, the display interface testing apparatus further includes:

a fourth event response module configured to, in response to a second input event acting on the display interface by a preset event input object for inputting a line shape, generate an original line shape corresponding to the second input event;

a seventh calculation module configured to calculate a fifth difference image between the display interface and a second target interface including the original line shape, and perform binarization processing on the fifth difference image to obtain a second binary difference image;

an eighth calculation module configured to perform image segmentation on the second binary difference image using a preset image segmentation algorithm to obtain a second segmented black-and-white image, and obtain a second original connected region included in the second segmented black-and-white image; and a line input function testing module configured to filter the second original connected region to obtain a second target connected region, and test a line input function that the display interface of the display terminal has based on the second target connected region.

In an example embodiment of the present disclosure, the line input function includes at least one of: a line color input function, a line smoothness input function, and a line width input function.

In an example embodiment of the present disclosure, when the line input function is the line color input function, testing the line input function that the display interface of the display terminal has based on the second target connected region includes:

traversing each pixel point inside a region in the second target interface corresponding to the second target connected region, obtaining a fourth pixel value of each pixel point inside the region, and calculating a first average value of the fourth pixel value;

calculating a color matching relationship of the original line shape according to the first average value of the fourth pixel value and a target pixel value of the original line shape; and testing the line color input function that the display interface of the display terminal has according to the color matching relationship.

In an example embodiment of the present disclosure, when the line input function is the line width input function, testing the line input function that the display interface of the display terminal has based on the second target connected region includes:

cropping the second target connected region from the second segmented black-and-white image to obtain a second initial cropping result, and scanning the first pixel point, whose fifth pixel value is greater than a second preset threshold, in the second initial cropping result based on a second preset search direction and a preset pixel width;

obtaining a sixth pixel value and a seventh pixel value of two pixel points adjacent to the first pixel point in a horizontal position, and determining a target drawing direction according to the sixth pixel value and the seventh pixel value;

drawing a square that meets a preset condition based on the target drawing direction, and calculating a second average value of a side length of the square that meets the preset condition; and calculating a line width matching relationship of the original line shape according to the second average value and a target line width of the original line shape, and testing the line width input function that the display interface of the display terminal has according to the line width matching relationship.

In an example embodiment of the present disclosure, when the line input function is the line smoothness input function, testing the line input function that the display interface of the display terminal has based on the second target connected region includes:

searching for the first pixel point, whose sixth pixel value is greater than the second preset threshold, in the second initial cropping result based on a first preset search direction, and determining the first pixel point whose sixth pixel value is greater than the second preset threshold in the second initial cropping result as a target pixel point;

calculating a first geodesic distance between all pixel points included in the second initial cropping result and the target pixel point, and determining a first endpoint of the original line shape from all pixel points according to the first geodesic distance;

calculating a second geodesic distance between all pixel points included in the second initial cropping result and the first endpoint, and determining a second endpoint of the original line shape from all pixel points according to the second geodesic distance; and according to an endpoint position of the first endpoint, an endpoint position of the second endpoint and an endpoint position of a target endpoint of the original line shape, calculating a line smoothness matching relationship of the original line shape, and testing the line smoothness input function that the display interface of the display terminal has according to the line smoothness matching relationship.

In an example embodiment of the present disclosure, the preset event input object includes a mechanical arm.

The specific details of each module in the above-mentioned display interface testing apparatus have been described in detail in the corresponding display interface testing methods, and thus repeated descriptions will be omitted here.

It should be noted that although several modules or units of the devices for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

An example embodiment of the present disclosure also provides an electronic device capable of implementing the above methods.

Those skilled in the art can understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which can be collectively referred to as "circuit", "module", or "system".

An electronic device 1800 according to an example embodiment of the present disclosure is described below with reference to FIG. 18. The electronic device 900 shown in FIG. 18 is only an example, and should not impose any limitation on the functions and scope of use of the embodiments of the present disclosure.

Figure 18:
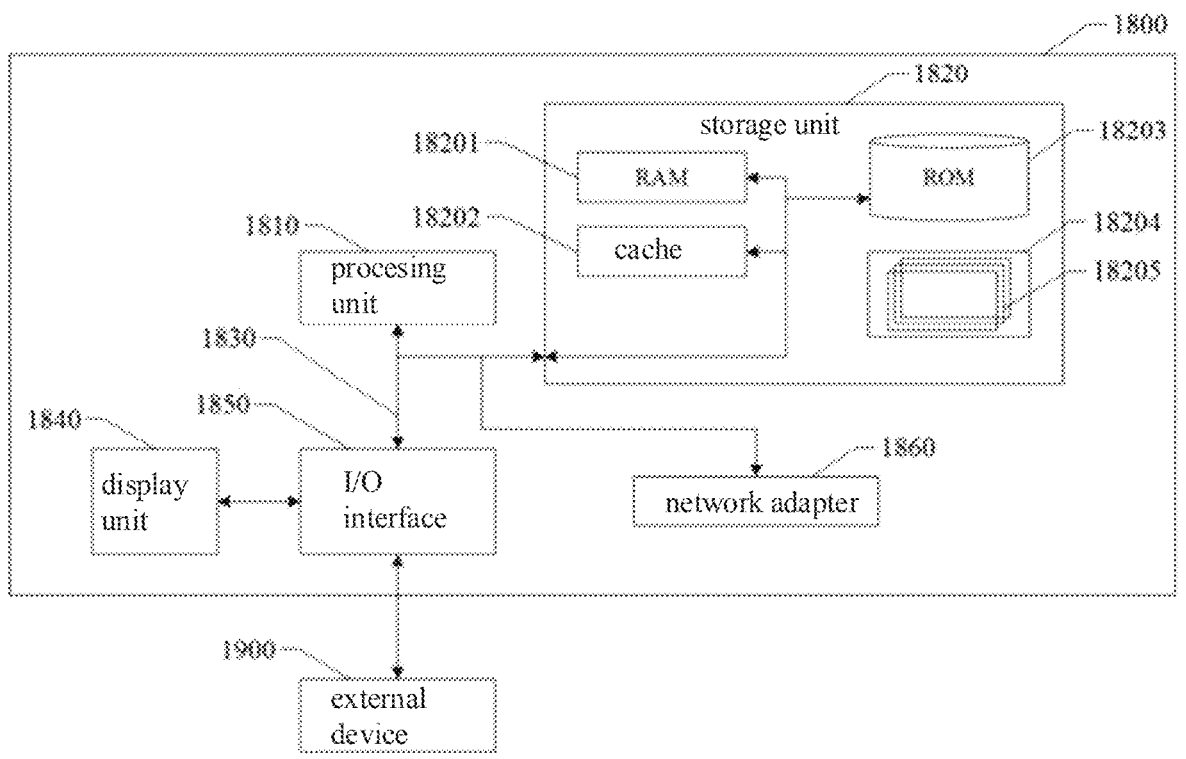
FIG. 18 schematically shows an electronic device for implementing the above-mentioned display interface testing method according to an example embodiment of the present disclosure.

As shown in FIG. 18, the electronic device 1800 is shown in the form of a general-purpose computing device. The components of the electronic device 1800 may include, but are not limited to, at least one processing unit 1810, at least one storage unit 1820, and a bus 1830 connecting different system components (including the storage unit 1820 and the processing unit 1810) and a display unit 1840.

The storage unit stores program codes, and the program codes can be executed by the processing unit 1810, so that the processing unit 1810 executes various example embodiments according to the present disclosure described in the "example methods" section of the present specification. For example, the processing unit 1810 may perform the steps shown in FIG. 1. In step S110, a current screen image of a display terminal and a desired screen image corresponding to the current screen image is obtained. In step 120, a first mean square error between the current screen image and the desired screen image is calculated, and a first image matching relationship between the current screen image and the desired screen image is determined according to the first mean square error. In step S130, a first difference image between the current screen image and the desired screen image is calculated, and a second image matching relationship between the current screen image and the desired screen image is determined according to the first difference image. In step S140, a display interface of the display terminal is tested according to the first image matching relationship and the second image matching relationship.

The storage unit 1820 may include a readable medium in the form of a volatile storage unit, such as a random access storage (RAM) unit 18201 and/or a cache storage unit 18202, and may further include a read-only storage unit (ROM) 18203.

The storage unit 1820 may further include a program/utility tool 18204 having a set (at least one) of program modules 18205. Such program modules 18205 include, but are not limited to, an operating system, one or more application programs, other program modules, and program data. Each or some combination of these examples may include an implementation of a network environment.

The bus 1830 may be one or more of several types of bus structures, including a memory unit bus or a memory unit controller, a peripheral bus, a graphics acceleration port, a processing unit, or a local area bus using any bus structure in a variety of bus structures.

The electronic device 1800 may also communicate with one or more external devices 1300 (such as a keyboard, a pointing device, a Bluetooth device, etc.), and may also communicate with one or more devices that enable a user to interact with the electronic device 1800, and/or may also communicate with any device (such as a router, a modem) that can enable the electronic device 1800 to interact with one or more other computing devices. Such communication can be performed through an input/output (I/O) interface 1850. Moreover, the electronic device 1800 may also communicate with one or more networks (such as a local area network (LAN), a wide area network (WAN), and/or a public network, such as the Internet) through the network adapter 1860. As shown in the figure, the network adapter 1860 communicates with other modules of the electronic device 1800 through the bus 1830. It should be understood that although not shown in the figure, other hardware and/or software modules may be used in conjunction with the electronic device 1800, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

An example embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product is run on a terminal device, the program codes are used to cause the terminal device to perform the steps according to various example embodiments of the present disclosure described in the above-mentioned exemplary methods.

A program product for implementing the above methods according to an example embodiment of the present disclosure may adopt a portable compact disc read-only memory (CD-ROM) and include program codes, and may be run on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the present disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as illustrative only, and the true scope and spirit of the present disclosure should be defined by the appended claims.

What is claimed is:

1. A display interface testing method, comprising:
obtaining a current screen image of a display terminal and a desired screen image corresponding to the current screen image;
calculating a first mean square error between the current screen image and the desired screen image, and determining a first image matching relationship between the current screen image and the desired screen image according to the first mean square error;
calculating a first difference image between the current screen image and the desired screen image, and determining a second image matching relationship between the current screen image and the desired screen image according to the first difference image; and
testing a display interface of the display terminal according to the first image matching relationship and the second image matching relationship.

2. The display interface testing method according to claim 1, wherein calculating the first mean square error between the current screen image and the desired screen image, and determining the first image matching relationship between the current screen image and the desired screen image according to the first mean square error, comprises:
obtaining a first pixel value of a first pixel point comprised in the current screen image, and a second pixel value of a second pixel point of the desired screen image;
calculating a pixel difference between the first pixel value and the second pixel value of the second pixel point corresponding to the first pixel point, and calculating the first mean square error according to the pixel difference; and calculating a first difference relationship between the first mean square error and a first preset threshold, and obtaining the first image matching relationship between the current screen image and the desired screen image according to the first difference relationship.

3. The display interface testing method according to claim 2, wherein calculating the first difference image between the current screen image and the desired screen image, and determining the second image matching relationship between the current screen image and the desired screen image according to the first difference image comprises:

when it is determined that the first image matching relationship exists, generating the first difference image between the current screen image and the desired screen image according to the pixel difference;

segmenting the first difference image based on a preset image segmentation algorithm to obtain a foreground image and a background image comprised in the first difference image, and calculating the number of non-zero pixels comprised in the foreground image; and obtaining the second image matching relationship between the current screen image and the desired screen image according to the number of non-zero pixels.

4. The display interface testing method according to claim 3, wherein testing the display interface of the display terminal according to the first image matching relationship and the second image matching relationship comprises:

in response to determining that the first image matching relationship exists and the second image matching relationship exists, determining that display function testing of the display interface of the display terminal is passed; or in response to determining that the first image matching relationship does not exist or the second image matching relationship does not exist, determining that the display function testing of the display interface of the display terminal has failed.

5. The display interface testing method according to claim 1, further comprising:

in response to an erasing event acting on a preset region in the display interface by a preset event input object, erasing the preset region to obtain a target screen image comprising an erased region;

obtaining the erased region in the target screen image and an original region in the display interface corresponding to the preset region, and calculating a second mean square error and a second difference image between the erased region and the original region;

determining a first region matching relationship and a second region matching relationship between the erased region and the preset region according to the second mean square error and the second difference image; and according to the first region matching relationship and the second region matching relationship, testing an erasing function that the display interface of the display terminal has.

6. The display interface testing method according to claim 1, further comprising:

obtaining a control screenshot corresponding to an interactive control comprised in an interactive interface, and searching for a matching template page image of the interactive control corresponding to the control screenshot in a preset image template library;

obtaining a coordinate position of the interactive control in the template page image, and sending the coordinate position to a preset event input object;

in response to a touch event on the display interface by the preset event input object based on the coordinate position, obtaining a touch region corresponding to the touch event, and calculating a third mean square error and a third difference image between the touch region and the control screenshot; and determining a first control matching relationship and a second control matching relationship between the touch region and the control screenshot according to the third mean square error and the third difference image, and testing a touch function of the interactive control in the display interface of the display terminal according to the first control matching relationship and the second control matching relationship.

7. The display interface testing method according to claim 1, further comprising:

in response to a first input event acting on the display interface by a preset event input object for inputting preset content, generating original content corresponding to the first input event, and performing normalization processing on the original content to obtain normalized content;

calculating a fourth difference image between the display interface and a first target interface comprising target content, and calculating a sub-content image of each sub-content comprised in the normalized content according to the fourth difference image;

calculating a fourth mean square error between the sub-content image and a sub-template image of a sub-template content corresponding to the sub-content in the preset content, and determining a content matching relationship between the sub-content image and the sub-template image according to the fourth mean square error; and testing an input function and/or a machine learning function of the display interface of the display terminal according to the content matching relationship.

8. The display interface testing method according to claim 7, wherein calculating the sub-content image of each sub-content comprised in the normalized content according to the fourth difference image comprises:

performing grayscale conversion on the fourth difference image to obtain a first binary difference image, and performing image segmentation on the first binary difference image using a preset image segmentation algorithm to obtain a first segmented black-and-white image;

obtaining a first original connected region comprised in the first segmented black-and-white image, and filtering the first original connected region to obtain a first target connected region;

cropping the first target connected region from the first segmented black-and-white image to obtain a first initial cropping result, and searching for the first pixel point, whose third pixel value is greater than a second preset threshold, in the first initial cropping result based on a first preset search direction; and performing region growing with the first pixel point as a seed point, filling an internal region of a graphic outline that the first initial cropping result has, so as to obtain a first target cropping result, and adjusting a size of the first target cropping result to obtain the sub-content image of each sub-content comprised in the normalized content.

9. The display interface testing method according to claim 7, wherein the original content comprises an original graphic and/or an original character;

wherein original graphic comprises any one or more of: a rectangle, an ellipse, a triangle, a regular polygon and an irregular polygon.

10. The display interface testing method according to claim 9, wherein when the original graphic is the rectangle, after calculating the sub-content image of each sub-content comprised in the normalized content according to the fourth difference image, the display interface testing method further comprises:

obtaining a length value of a longer side of the rectangle and a length value of a shorter side of the rectangle, and calculating a first ratio between the length value of the longer side and the length value of the shorter side;

when it is determined that the first ratio is greater than a third preset threshold, or less than a fourth preset threshold, determining that the original graphic is the rectangle;

when it is determined that the first ratio is between the third preset threshold and the fourth preset threshold, determining that the original graphic is a square.

11. The display interface testing method according to claim 9, wherein when the original graphic is the ellipse, after calculating the sub-content image of each sub-content comprised in the normalized content according to the fourth difference image, the display interface testing method further comprises:

obtaining a length value of a first diameter of the ellipse in an ordinate direction and a length value of a second diameter of the ellipse in an abscissa direction, and calculating a second ratio between the length value of the first diameter and the length value of the second diameter;

when it is determined that the first ratio is greater than a third preset threshold, or less than a fourth preset threshold, determining that the original graphic is the ellipse;

when it is determined that the first ratio is between the third preset threshold and the fourth preset threshold, determining that the original graphic is a circle.

12. The display interface testing method according to claim 7, wherein the preset event input object comprises a mechanical arm.

13. The display interface testing method according to claim 1, further comprising:

in response to a second input event acting on the display interface by a preset event input object for inputting a line shape, generating an original line shape corresponding to the second input event;

calculating a fifth difference image between the display interface and a second target interface comprising the original line shape, and performing binarization processing on the fifth difference image to obtain a second binary difference image;

performing image segmentation on the second binary difference image using a preset image segmentation algorithm to obtain a second segmented black-and-white image, and obtaining at least one second original connected region comprised in the second segmented black-and-white image; and filtering the at least one second original connected region to obtain a second target connected region, and testing a line input function that the display interface of the display terminal has based on the second target connected region.

14. The display interface testing method according to claim 13, wherein the line input function comprises at least one of: a line color input function, a line smoothness input function, and a line width input function.

15. The display interface testing method according to claim 14, wherein when the line input function is the line color input function, testing the line input function that the display interface of the display terminal has based on the second target connected region comprises:

traversing each pixel point inside a region in the second target interface corresponding to the second target connected region, obtaining a fourth pixel value of each pixel point inside the region, and calculating a first average value of the fourth pixel value;

calculating a color matching relationship of the original line shape according to the first average value of the fourth pixel value and a target pixel value of the original line shape; and testing the line color input function that the display interface of the display terminal has according to the color matching relationship.

16. The display interface testing method according to claim 14, wherein when the line input function is the line width input function, testing the line input function that the display interface of the display terminal has based on the second target connected region comprises:

cropping the second target connected region from the second segmented black-and-white image to obtain a second initial cropping result, and scanning the first pixel point, whose fifth pixel value is greater than a second preset threshold, in the second initial cropping result based on a second preset search direction and a preset pixel width;

obtaining a sixth pixel value and a seventh pixel value of two pixel points adjacent to the first pixel point in a horizontal position, and determining a target drawing direction according to the sixth pixel value and the seventh pixel value;

drawing a square that meets a preset condition based on the target drawing direction, and calculating a second average value of a side length of the square that meets the preset condition; and calculating a line width matching relationship of the original line shape according to the second average value and a target line width of the original line shape, and testing the line width input function that the display interface of the display terminal has according to the line width matching relationship.

17. The display interface testing method according to claim 16, wherein when the line input function is the line smoothness input function, testing the line input function that the display interface of the display terminal has based on the second target connected region comprises:

searching for the first pixel point, whose sixth pixel value is greater than the second preset threshold, in the second initial cropping result based on a first preset search direction, and determining the first pixel point whose sixth pixel value is greater than the second preset threshold in the second initial cropping result as a target pixel point;

calculating first geodesic distances between all pixel points comprised in the second initial cropping result and the target pixel point, and determining a first endpoint of the original line shape from all pixel points according to the first geodesic distances;

calculating second geodesic distances between all pixel points comprised in the second initial cropping result and the first endpoint, and determining a second endpoint of the original line shape from all pixel points according to the second geodesic distances; and according to an endpoint position of the first endpoint, an endpoint position of the second endpoint and an endpoint position of a target endpoint of the original line shape, calculating a line smoothness matching relationship of the original line shape, and testing the line smoothness input function that the display interface of the display terminal has according to the line smoothness matching relationship.

18. A non-transitory computer-readable storage medium having a computer program stored thereon, wherein when the computer program is executed by a processor, the processor is caused to:

obtain a current screen image of a display terminal and a desired screen image corresponding to the current screen image;

calculate a first mean square error between the current screen image and the desired screen image, and determine a first image matching relationship between the current screen image and the desired screen image according to the first mean square error;

calculate a first difference image between the current screen image and the desired screen image, and determine a second image matching relationship between the current screen image and the desired screen image according to the first difference image; and test a display interface of the display terminal according to the first image matching relationship and the second image matching relationship.

19. An electronic device, comprising:

a processor; and a memory configured to store instructions executable by the processor;

wherein the processor is configured to execute the executable instructions to:

obtain a current screen image of a display terminal and a desired screen image corresponding to the current screen image;

calculate a first mean square error between the current screen image and the desired screen image, and determine a first image matching relationship between the current screen image and the desired screen image according to the first mean square error;

calculate a first difference image between the current screen image and the desired screen image, and determine a second image matching relationship between the current screen image and the desired screen image according to the first difference image; and test a display interface of the display terminal according to the first image matching relationship and the second image matching relationship.

*    *    *    *    *